US010343845B2

(12) United States Patent
Hoynash et al.

(10) Patent No.: US 10,343,845 B2
(45) Date of Patent: Jul. 9, 2019

(54) CROSS-BELT SYSTEM AND AUTOMATED ITEM DIVERSION

(71) Applicant: DATALOGIC ADC, INC., Eugene, OR (US)

(72) Inventors: Peter Hoynash, Perkiomenville, PA (US); Stefano Vassura, Rastignano (IT); Stanley Sroka, Coopersburg, PA (US)

(73) Assignee: DATALOGIC USA, INC., Eugene, OR (US)

( * ) Notice: Subject to any disclaimer, the term of this patent is extended or adjusted under 35 U.S.C. 154(b) by 0 days.

(21) Appl. No.: 15/350,272

(22) Filed: Nov. 14, 2016

(65) Prior Publication Data
US 2017/0057748 A1    Mar. 2, 2017

Related U.S. Application Data

(62) Division of application No. 14/504,210, filed on Oct. 1, 2014, now Pat. No. 9,493,308.

(60) Provisional application No. 62/035,950, filed on Aug. 11, 2014.

(51) Int. Cl.
| G06F 7/00 | (2006.01) |
| B65G 17/34 | (2006.01) |
| B07C 5/36 | (2006.01) |
| B07C 5/04 | (2006.01) |
| B65G 43/08 | (2006.01) |
| B07C 3/08 | (2006.01) |
| B07C 5/34 | (2006.01) |

(52) U.S. Cl.
CPC .............. *B65G 17/345* (2013.01); *B07C 3/08* (2013.01); *B07C 5/04* (2013.01); *B07C 5/34* (2013.01); *B07C 5/36* (2013.01); *B65G 43/08* (2013.01); *B65G 2207/18* (2013.01)

(58) Field of Classification Search
None
See application file for complete search history.

(56) References Cited

U.S. PATENT DOCUMENTS

| 2,591,122 A | 4/1952 | Blind |
| 3,912,071 A | 10/1975 | Nielsen |
| 4,096,936 A | 6/1978 | Nielsen |

(Continued)

FOREIGN PATENT DOCUMENTS

| KR | 1000722572 B1 | 6/2007 |
| KR | 20140037740 A | 3/2014 |
| WO | 2014011852 A1 | 1/2014 |

OTHER PUBLICATIONS

Beumer Cross-Belt Sortation System at Chico's Distribution Center, YouTube, Last Accessed Aug. 11, 2014, https://www.youtube.com/watch?v=vEJECJ37j-U; 1 page.

(Continued)

*Primary Examiner* — Yolanda R Cumbess
(74) *Attorney, Agent, or Firm* — Shook, Hardy & Bacon, L.L.P.

(57) ABSTRACT

A sorting method, cross-belt system, and computer-storage media are provided for conveying and sorting items. The cross-belt system includes a plurality of interlocking palettes that form a conveyor belt. Each palette may be engaged by a series of rollers that are triggered to discharge items on the palettes to appropriate loading areas. The rollers are configured to move a belt of the palettes in one of at least two directions to a selected loading area that is positioned on either side of the cross-belt system.

20 Claims, 24 Drawing Sheets

(56) References Cited

U.S. PATENT DOCUMENTS

| | | | | |
|---|---|---|---|---|
| 4,544,064 | A | * | 10/1985 | Felder .............. G06K 7/10871 |
| | | | | 209/583 |
| 4,781,281 | A | | 11/1988 | Canziani |
| 5,547,084 | A | | 8/1996 | Okada et al. |
| 5,588,520 | A | | 12/1996 | Affaticati et al. |
| 6,273,268 | B1 | | 8/2001 | Axmann |
| 6,446,782 | B1 | | 9/2002 | Patrick |
| 6,478,138 | B1 | | 11/2002 | Edwards et al. |
| 8,100,058 | B2 | | 1/2012 | Austin |
| 9,595,029 | B1 | * | 3/2017 | Catoe .................. G06Q 20/18 |
| 2002/0179502 | A1 | * | 12/2002 | Cerutti .................. B07C 3/02 |
| | | | | 209/583 |
| 2003/0221935 | A1 | | 12/2003 | Barklin et al. |
| 2004/0000997 | A1 | * | 1/2004 | Stevens, III ....... G08B 13/2462 |
| | | | | 340/572.1 |
| 2006/0151288 | A1 | * | 7/2006 | Reznik ................ B65G 47/681 |
| | | | | 198/370.1 |
| 2006/0278500 | A1 | * | 12/2006 | Guernsey .............. B65G 17/40 |
| | | | | 198/853 |
| 2009/0287346 | A1 | | 11/2009 | Hirsch et al. |
| 2013/0235368 | A1 | * | 9/2013 | Tornwall ................ A47F 9/047 |
| | | | | 356/51 |
| 2014/0014468 | A1 | | 1/2014 | Pilarz et al. |
| 2014/0081446 | A1 | | 3/2014 | Kim |
| 2014/0091015 | A1 | | 4/2014 | Kim et al. |
| 2014/0129362 | A1 | * | 5/2014 | Marquis ................ G07G 1/0036 |
| | | | | 705/23 |
| 2014/0190799 | A1 | * | 7/2014 | Porter .................. B65G 15/30 |
| | | | | 198/851 |
| 2014/0214596 | A1 | * | 7/2014 | Acker, Jr. .......... G06Q 30/0633 |
| | | | | 705/26.8 |
| 2016/0270562 | A1 | * | 9/2016 | McPherson ............ A47F 9/048 |

OTHER PUBLICATIONS

Beumer Group LS-4000CB Cross-Belt Sorter, provided Jun. 13, 2014, 4 pages.
Interroll Sorter (Animation), You Tube, last accessed Aug. 11, 2014, https://www.youtube.com/watch?v=wSoPBGIRIas; 4 pages.
Interroll Crossbelt Sorter, last accessed Aug. 11, 2014, http://www.interroll.com/media/editorial_media/interroll_group/ downloads/foerdermodule_subsysteme/crossbelt_sorter_broschuere/Kat_Sorter_en_WEB .pdf; 36 pages.
Interroll Drum Motors, last accessed Aug. 11, 2014, http://www.interroll.com/media/editorial_media/interroll_group/ downloads/antriebe_foerderrollen/drivers_rollers/plastic_modular_belt/Piastic_Modular_Belt_2010_neu.pdf; 6 pages.
Interroll Synchronous Drum Motors, last accessed Aug. 11, 2014, http://www.interroll.com/media/editorial_media/ interroll_group/downloads/antriebe_foerderrollen/drivers_rollers/synchronous_drum_motor/ Synch_DrumMotor_EN_130407 _WEB.pdf; 48 pages.
Mecalux, K-LOG Storage Systems and Interroll Secure Major Contract for Procter & Gamble Manufacturing GmbH Distribution Center, Press Release, last accessed Aug. 11, 2014, http://www.interroll.com/en/interroll-group/press/news- archive/mecalux-k-log-storage-systems-interroll-secure-major-contract-procter-gamble-manufacturing-gmbh- distribution-centre.18916.php; 2 pages.
Interroll Supermarket Solutions, last accessed Aug. 11, 2014, http://www.interroll.com/media/editorial_media/ interroll_group/down loads/antriebe_foerderrollen/drivers _rollers/supermarket_ solutions/2012-04-27_SMSolutions_en. pdf; 50 pages.
Interroll Mid-Year Report 2013, 32 pages.
ITAB Group, Self-Checkout Solutions, Sweden, last accessed Aug. 12, 2014, http://www.ilab.se/en/PRODUCTS--SERVICES/Shop-equipment/Self-checkout/; 2 pages.
Casula, Eros, Datalog installa Jade X7 Scanner da Tesco, Published May 24, 2014, last accessed Aug. 12, 2014, http://www.retailwatch.it/Brand-Prodotti/Merchandising-Promoioni/Maggio-2014/Datalogic-installa-Jade-X7-Scanner-da-Tesco.aspv; 3 pages.
Intralox, Activated Roller Belt Technology, last accessed Sep. 30, 2014, 1 page. http://www.intralox.com/arb-technology.aspx.
Non-Final Office Action dated Feb. 3, 2016, for U.S. Appl. No. 14/504,210, 5 pages.
Notice of Allowance dated Jul. 12, 2016, for U.S. Appl. No. 14/504,210, 7 pages.

* cited by examiner

CROSS-BELT SYSTEM AND AUTOMATED ITEM DIVERSION

CROSS-REFERENCE TO RELATED APPLICATIONS

This application claims priority from U.S. patent application Ser. No. 14/504,210, filed Oct. 1, 2014, entitled "Cross-Belt System and Automated Item Diversion," which itself claims priority from U.S. Provisional Application No. 62/035,950, filed Aug. 11, 2014, entitled "Cross-Belt System and Automated Item Diversion," each of which is assigned or under obligation of assignment to the same entity as this application. The entire contents of each of U.S. patent application Ser. No. 14/504,210 and U.S. Provisional Application No. 62/035,950 is herein incorporated by reference in its entirety.

SUMMARY

A summary of various aspects of the embodiments of the invention is provided here to offer an overview of the patent and to introduce a selection of concepts that are further described in the detailed description section below. This summary is not intended to identify key or essential features of the claimed subject matter, nor is it intended to be used as an aid in isolation to determine the scope of the claimed subject matter. In brief and at a high level, this patent describes, among other things, a cross-belt system and methods for sorting items on the cross-belt system.

In one embodiment, a variable-pitch cross-belt system includes a plurality of palettes and a diverter component. The plurality of palettes interlocks to form a conveyor belt. The palettes are then engaged by the diverter component. The diverter component comprises at least one controller and a series of rollers. In response to a trigger from the controller, the series of rollers lift to engage the palettes. Upon engaging the palettes, the items on the palettes are diverted to one or more loading areas.

In another embodiment, the cross-belt system may execute a method to sort the items. The cross-belt system may have one or more items moving on palettes to an offloading area. The palettes may carry the one or more items. In turn, the cross-belt system obtains information about one or more of the items. The cross-belt system processes this information and selects an item for discharge, based on (but not limited to), among other things, size, temperature, expiration date, destination, or other order requirements. The cross-belt system discharges the selected item(s) by engaging a series of rollers that are positioned below the palettes. In some embodiments, a processor of the cross-belt system triggers the rollers to engage the palettes.

In yet another embodiment, a system is provided for identifying and diverting one or more items that correspond to a transaction to a selected and/or designated receiving area or destination. In embodiments, the system may employ a cross-belt that diverts each item corresponding to the transaction to a receiving area or destination selected for the particular transaction. Accordingly, the system provides a fast and efficient method for automated item diversion that prevents cross-contamination between items from separate transactions such that each transaction is funneled to designated receiving areas or destinations. Moreover, the system may include an exception area that receives items that require further processing before purchase and/or dispatch to a selected receiving area.

BRIEF DESCRIPTION OF THE SEVERAL VIEWS OF THE DRAWINGS

Illustrative embodiments of the invention are described in detail below with reference to the attached drawing figures, and wherein.

DETAILED DESCRIPTION

Figure 1:
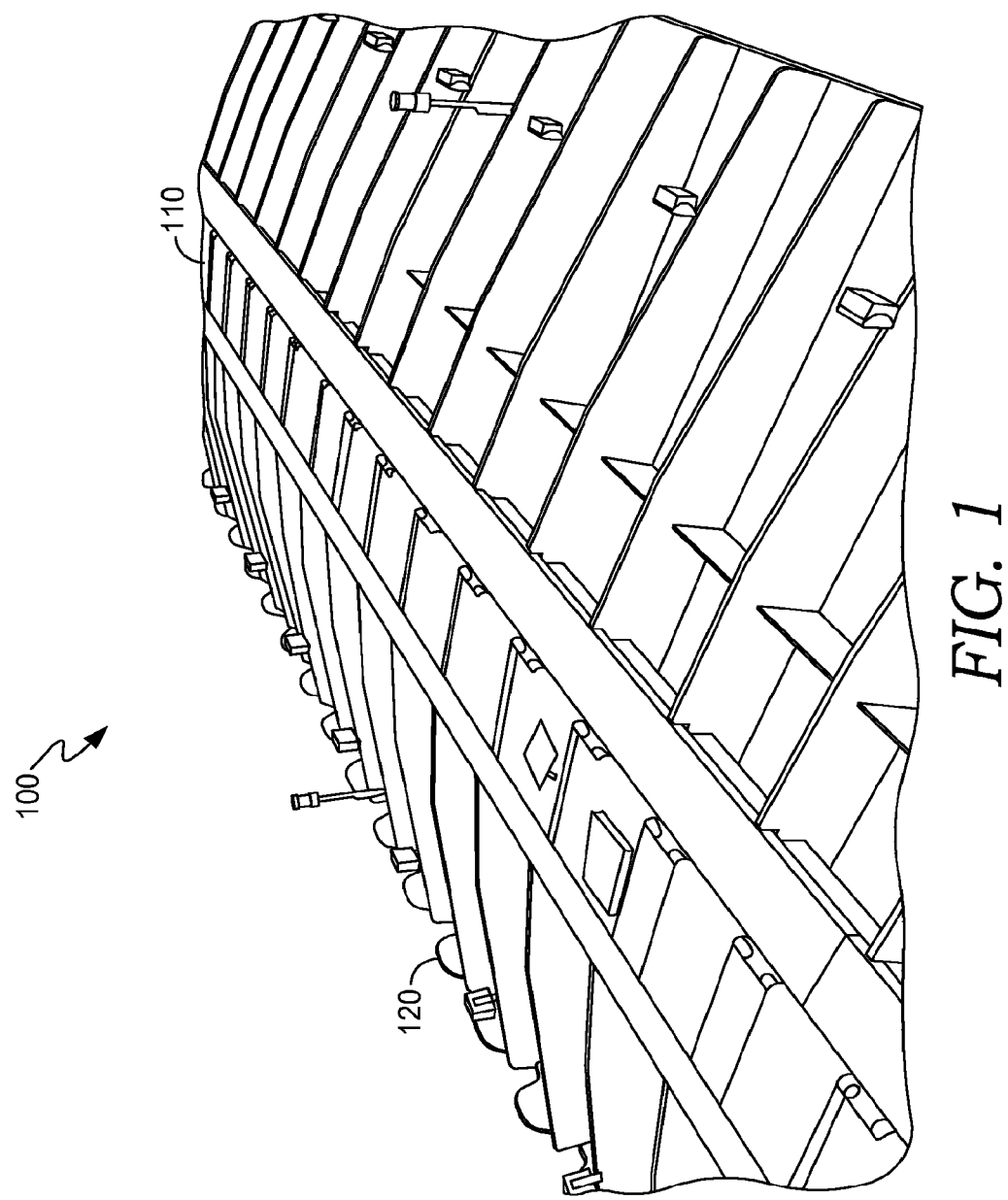
FIG. 1 depicts a cross-belt system with a plurality of offloading areas, in accordance with embodiments of the invention.

The subject matter of select embodiments of the invention is described with specificity in this patent to meet statutory requirements. But the description itself is not intended to define what the inventors regard as embodiments of the invention. Rather, the claims define the various embodiments. The claimed subject matter might be implemented in other ways to include different steps or combinations of steps similar to the ones described in this document, in conjunction with other present or future technologies. Terms should not be interpreted as implying any particular order among or between various steps herein disclosed unless and except when the order of individual steps is explicitly described.

Embodiments of our technology include, among other things: a method, system, or set of instructions embodied on one or more computer-readable media in the cross-belt system. For instance, sorting instructions may be programmed in the cross-belt system. The system, apparatus, and methods described herein utilize multi-directional (e.g., forward, right, and left) conveyance and sorting features to efficiently and accurately transport and sort items in a retail or industrial transaction to a receiving area selected for a particular transaction. Upon identification of an item in a transaction, a receiving area and/or bay is selected to receive all the items belonging to and/or corresponding to the particular transaction. Items that require additional processing may be dispatched to an exception area for said processing, disposal, and/or removal from the transaction. As such, the embodiments of the invention reduce errors while promoting fast, efficient transactions requiring minimal user interaction for completion of a transaction within a physical retail store, or to fulfill a purchase order in a remote setting (e.g., shipping or inventory warehouse). Accidental co-mingling of items corresponding to different, separate transactions is reduced by automating the transport and sorting process. Additionally, high-confidence item recognition and use of a cross-belt system maintain efficient speeds and high throughput of transactions. Once items are dispatched to and/or received by receiving areas and/or bays, all the items in a particular transaction may be bagged, packed, and/or shipped, accordingly. In some embodiments, the items include mail, parcels, groceries, or products.

Throughout this patent, several acronyms and shorthand notations are used to aid the understanding of certain concepts pertaining to the associated system and services. These acronyms and shorthand notations are intended to help provide an easy methodology of communicating the ideas expressed herein and are not meant to limit the scope of the embodiments of the invention. The following is a list of these acronyms:

CD-ROM Compact Disc Read-only Memory
CPU Central Processing Unit
DVD Digital Versatile Disc
EAS Electronic Article Surveillance
EE-PROM Electronically Erasable Programmable Read-only Memory
E-ISBN Electronic International Standard Book Number
ISBN International Standard Book Number
NFC Near Field Communication
NSRL National Software Reference Library
PDA Personal Data Assistant
RAM Random Access Memory
RFID Radio Frequency Identification
ROM Read-only Memory
SSCC Serial Shipping Container Code
UPC Universal Product Code
WiFi Wireless Fidelity Further, various technical terms are used throughout this description. An illustrative resource that fleshes out various aspects of these terms can be found in Newton's Telecom Dictionary, 25th Edition (2009).

As utilized herein, the term "palette" refers to an interlocking carrier component having a chamber that houses: one or more drive rollers, a belt that surrounds the drive rollers, and one or more idler rollers that engage a bottom of the belt that surrounds the drive rollers. The side walls of each palette include an alignment and interlocking pattern for mating with adjacent palettes to form a conveyor belt for a cross-belt system. The belt of the palette moves in a direction perpendicular to the direction of the conveyor belt.

Computer-readable media include both volatile and non-volatile media, removable and non-removable media, and contemplate media readable by a database, a switch, and various other network devices. Computer-readable media include computer storage media and media implemented in any way for storing information. Examples of stored information include computer-useable instructions, data structures, program modules, and other data representations. Computer storage media examples include RAM, ROM, EE-PROM, flash memory or other memory technology, CD-ROM, DVD, holographic media or other optical disc storage, magnetic cassettes, magnetic tape, magnetic disk storage, and other magnetic storage devices. These technologies can store data momentarily, temporarily, or permanently. In some embodiments, the computer-readable media may store retail information for items on the palette. The cross-belt system accesses instructions on the computer-readable media to process the items on the palettes. In other embodiments, the retail information is stored in a database that is accessible to the cross-belt system.

In some embodiments, the cross-belt system may be configured for retail applications where conveyor belt speed is much slower. In many instances, the speed of the conveyor belt is limited by customer and operator presence. The customer or operator loads items onto and unloads items from the conveyor belt. The loaded items vary significantly in size (from 0.5 in. to 20 in.). The variable size may be handled by having multiple palettes for large items. This allows for variable pitch as opposed to constant pitch on the conveyor belt.

The variable pitch maintains reasonable throughput without increasing the speed of the conveyor belt. A speed increase of the conveyor belt may be impractical because item loading is manual. In some embodiments, large-sized packages are processed by multiple palettes on the cross-belt system. One or more (e.g., 10+) small palettes can be activated to divert a single item to a loading area. In other scenarios, a single palette is activated to divert a small item to the loading area. Thus, the variable activation of the palettes reduces the minimum gap needed (if any) between items that are sorted among multiple loading areas connected to the conveyor belt.

FIG. 1 depicts a cross-belt system 100 with a plurality of loading areas 120, in accordance with embodiments of the invention. The cross-belt system moves items between a first end and a second end of the conveyor belt 110. The conveyor belt 110 comprises a plurality of palettes that are interlocked. The palettes move items to one or more of the loading areas 120. The loading areas 120 may include a chute that allows the items to fall from the conveyor belt 110 to a selected loading area 120. In some embodiments, a controller is electrically connected to the cross-belt system. The controller may trigger the palettes to deliver an item that the palettes are carrying to a specific loading area 120.

In certain embodiments, the conveyor belt 110 is comprised of palettes. The loading areas 120 may be attached at locations on opposite sides of the conveyor belt 110. If maintenance of the conveyor belt 110 is necessary, the loading areas 120 may be detached from the conveyor belt 110 to access the controls and mechanical parts of the conveyor belt 110.

The palettes of the cross-belt system 100 are modular components of the conveyor belt 110. The palettes interlock to form the conveyor belt 110. The interlocking may be based on the patterns available at the sides of the palette. Each palette may have a belt that moves in an orthogonal direction to the flow of the items on the conveyor belt. Furthermore, the palettes may have a guide that prevents side-loading of the belt. The guide, in one embodiment, is positioned to be slightly (1-2 cm) above the surface of the belt.

In certain embodiments, the palette includes a chamber that houses: one or more crowned rollers and idler rollers located to provide pinch contact between the inside and outside surface of the belt that surrounds the crowned rollers and idler rollers. In some embodiments, the crowned rollers may be replaced by flat rollers. The idler rollers engage a bottom part of the belt when contacted by diverter rollers that are activated by a controller. The belt that surrounds the crowned rollers is oriented to move in a direction orthogonal to the path of the conveyor belt. The palette belt is moved to discharge an article from said conveyor belt to an offloading area that is nearly perpendicular to the conveying path. The palette belt is moveable in at least two directions to discharge the selected item to a specified offloading area.

In certain embodiments, each palette may include at least one support member extending between adjacent palettes. The support member may have an interlocking pattern that locks adjacent palettes together. In turn, the interlocked palettes are movable together along the conveying path.

Figure 2A:
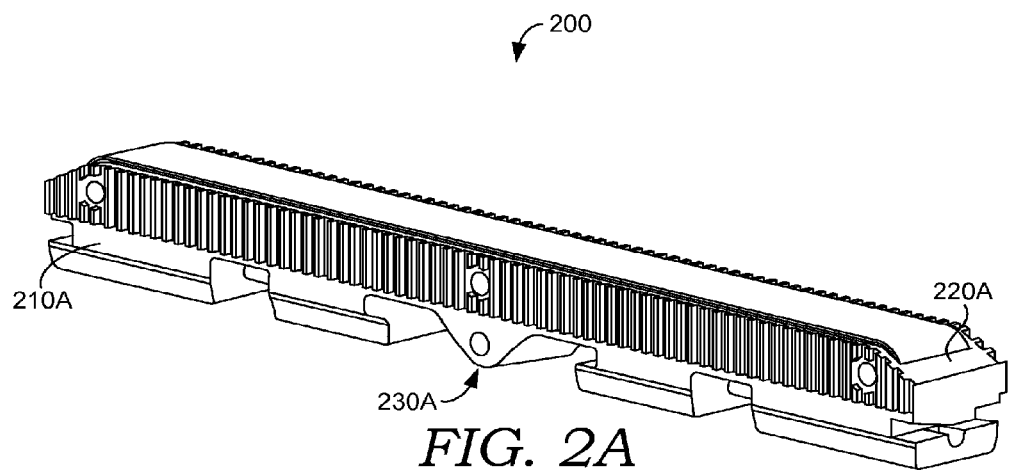
FIG. 2A depicts an exemplary palette of the cross-belt system, in accordance with embodiments of the invention.

FIG. 2A depicts an exemplary palette of the cross-belt system, in accordance with embodiments of the invention. The palette 200 has an enclosure (e.g., plastic or metal) and a belt. The belt moves items from the palette 200 to a selected offloading area. In one embodiment, the palette 200 may be fashioned out of a plastic polymer. The side walls of the enclosure are shaped to form mating (e.g., interlocking) profiles. The palette 200 may have an interlocking pattern 210A that connects and locks with adjacent palettes.

The interlocking pattern 210A locks adjacent palettes 200 as they travel along a straight, horizontal conveying path. The interlocking pattern 210A may, in certain embodiments, cause alignment of adjacent palettes 200 during interlocking. This interlocking allows the adjacent palettes 200 to travel along a straight, horizontal conveying path and prevents items from falling in between the palettes 200. The adjacent palettes 200 are locked to form a flat surface, which eliminates exposed pinch points. The palettes 200, in one embodiment, may be configured with two identical plastic (e.g., polymer) frame halves on both sides to allow mating on both sides of the palette 200.

In some embodiments, each palette 200 has ends at an edge 220A having a flat surface that is slanted toward a slipway to an offloading channel of the cross-belt system. This flat surface is part of a guard that prevents fingers, or small items, from entering into the enclosed portion of the cross-belt system.

The belt of the palette 200 is moved in a direction perpendicular to item flow. The belt of the palette 200 is guided by two rollers (e.g. crown rollers) that are placed at the very extreme end of the palette 200 and an idler roller or idler rollers 230A that transfer motion by contact with rollers below the palette 200. The driving chain engagement attachment locations in the palettes 200 are located toward the ends to maintain squareness during palette movement.

In one embodiment, the hinge point of the palettes 200 is placed at the lower part of palette 200 instead of using hinges placed near the surface level of the palettes 200. A low hinge point allows palettes to travel around a curve and separate for maintenance, while allowing modules to lock together when traveling on a straight path. The low hinge point also provides a full-width conveyor belt (e.g., no gaps between palette sections to avoid small items like ballpoint pens or razors to fall into a gap area). Additionally, in this configuration, the entire belt and pulley mechanism can be contained within the palette 200.

Figure 2B:
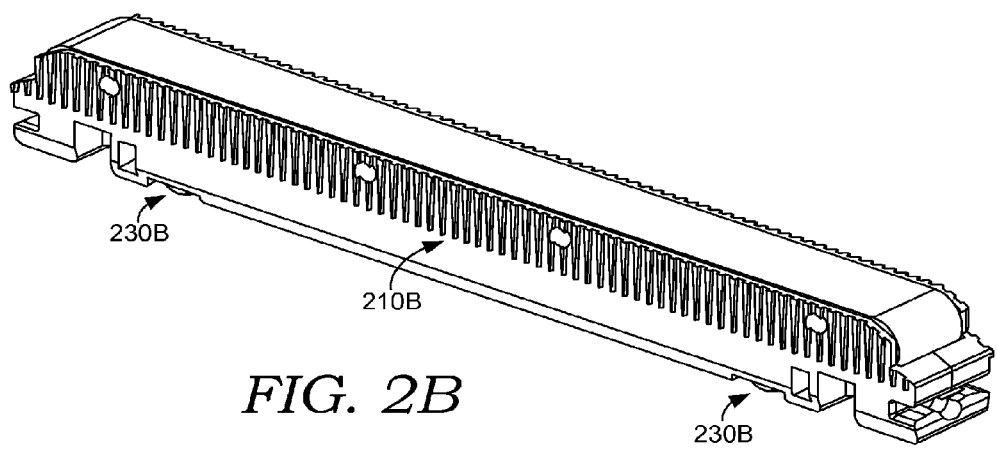
FIG. 2B depicts an alternative exemplary palette of the cross-belt system, in accordance with embodiments of the invention.

FIG. 2B depicts an alternative exemplary palette 200 of the cross-belt system, in accordance with embodiments of the invention. The interlocking pattern 210B may be shaped to form peaks or teeth of a comb, in some embodiments. The peak/teeth interlocking pattern 210B may be used to align adjacent palettes as they interlock with each other. The interlocking pattern 210B is placed on two sides (e.g., front and back) of each palette 200 that engages an adjacent palette 200.

Each palette may include the idler rollers 230B. In one embodiment, the idler rollers 203B are placed at two locations within the palette. At least two idler rollers 230B are positioned to cause the belt of the palette to move upon contact with one or more diverter rollers of the cross-belt system.

Figure 2C:
FIG. 2C depicts a front view of an exemplary palette of the cross-belt system, in accordance with embodiments of the invention.

FIG. 2C depicts a front view of an exemplary palette 200 of the cross-belt system, in accordance with embodiments of the invention. The front view of the palette shows the interlocking pattern. The palette also includes a passage 210C that locks into place with the chain of the cross-belt system. The passage 210C, in one embodiment, is located in at least two positions on the palette. The passage 210C may be positioned between the end rollers (e.g., crowned/driver rollers) and the idler rollers.

Figure 2D:
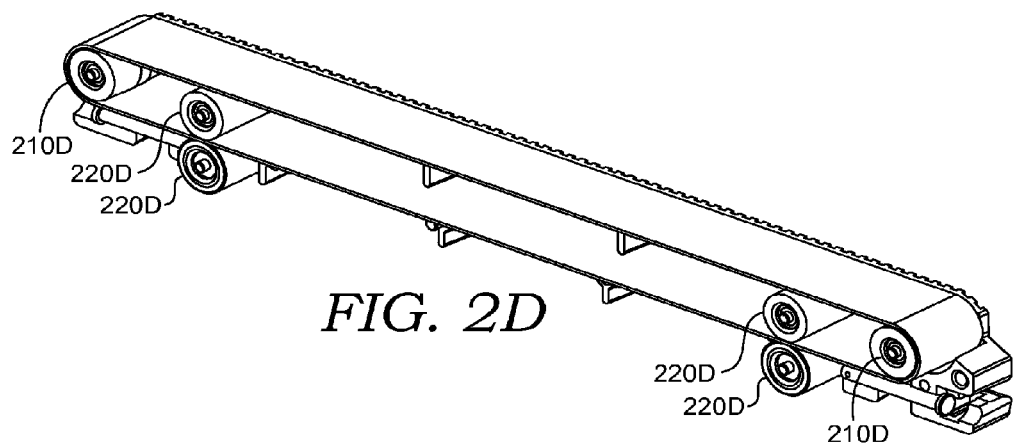
FIG. 2D depicts a cross-sectional view of an exemplary palette of the cross-belt system, in accordance with embodiments of the invention.

FIG. 2D depicts a cross-sectional view of an exemplary palette of the cross-belt system, in accordance with embodiments of the invention. The palette cross-section depicts the end rollers 210D and idler rollers 220D. In one embodiment, each palette includes at least two end rollers 210D and four idler rollers 220D. Two of the idler rollers 220D are below the belt of the palette and two of the idlers rollers 220D are above the belt. The two idler rollers 220D below the belt are engaged by the diverter rollers (not shown), which cause the two idler rollers 220D above the belt and the two end rollers 210D to move the palette belt.

Figure 2E:
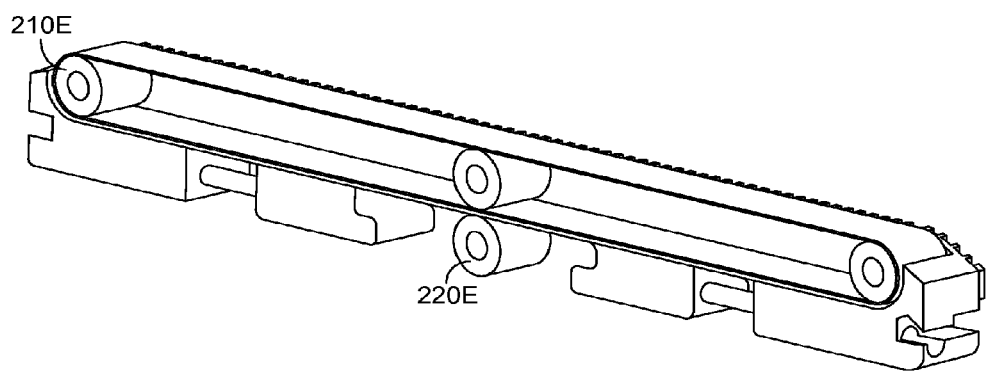
FIG. 2E depicts another cross-sectional view of an exemplary alternative palette of the cross-belt system, in accordance with embodiments of the invention.

FIG. 2E depicts another cross-sectional view of an exemplary alternative palette of the cross-belt system, in accordance with embodiments of the invention. The palette cross section depicts the end rollers 210E and idler rollers 220E. In some embodiments, each palette includes at least two end rollers 210E and two idler rollers 220E. One of the idler rollers 220E is below the belt of the palette and the other idler roller 220E is above the belt. The idler roller 220E below the belt is engaged by the diverter rollers (not shown), which cause the idler roller 220E above the belt and the two end rollers 210E to move the belt.

Figure 2F:
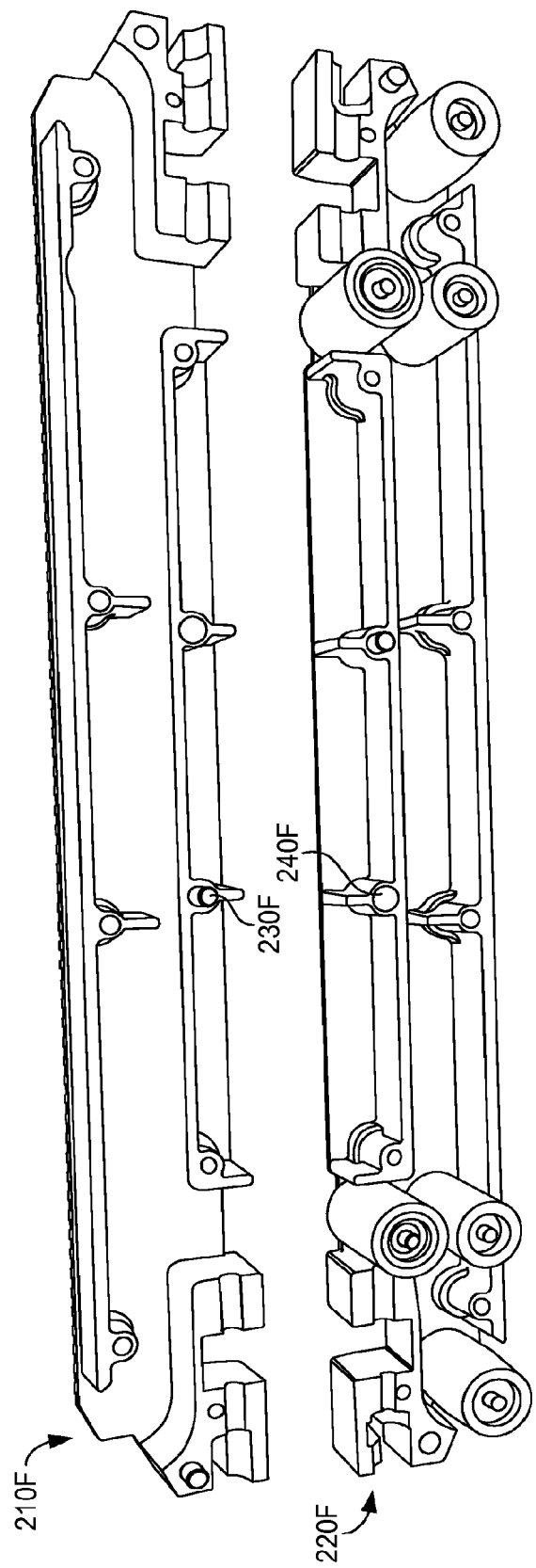
FIG. 2F depicts an exemplary housing for the palette of the cross-belt system, in accordance with embodiments of the invention.

FIG. 2F depicts an exemplary housing for the palette of the cross-belt system, in accordance with embodiments of the invention. The housing of the palette may include a first half 210F and second half 220F. The first half 210F and second half 220F are identical in certain embodiments. The first half 210F is shaped to meet with the second half 220F. The first half 210F may include a plurality of coupling points 230F that meet with notches 240F of the second half 220F. The coupling points 230F, in one embodiment, may be dowels that mate with the notches 240F of the second half 220F. The housing may include a fastening portion to lock the first half 210F and the second half 220F together. In one embodiment, the fastening portions include screws that are driven into one or more grooves in both the first and second halves 210F and 220F.

The second half 220F includes the rollers and the notches. The rollers include the idler rollers and the end rollers. The belt of the palette is positioned on the rollers. The second half 220F may include at least four notches that mate with dowels of the first half 210F. In one embodiment, the second half 220F may include dowels that mate with notches of the first half 210F.

Upon assembling and tightening the first and second halves, the palette is ready for attachment to the chain of the cross-belt system.

As part of the item sorting made available to customers, the cross-belt system is configured to discharge items on opposite sides of the cross-belt system. In one embodiment, the discharge direction of the items is perpendicular to the conveyor flow direction. The cross-belt system includes at least two discharge directions. The cross-belt system may employ rollers to discharge the items from the palettes of the conveyor belt.

Figure 3:
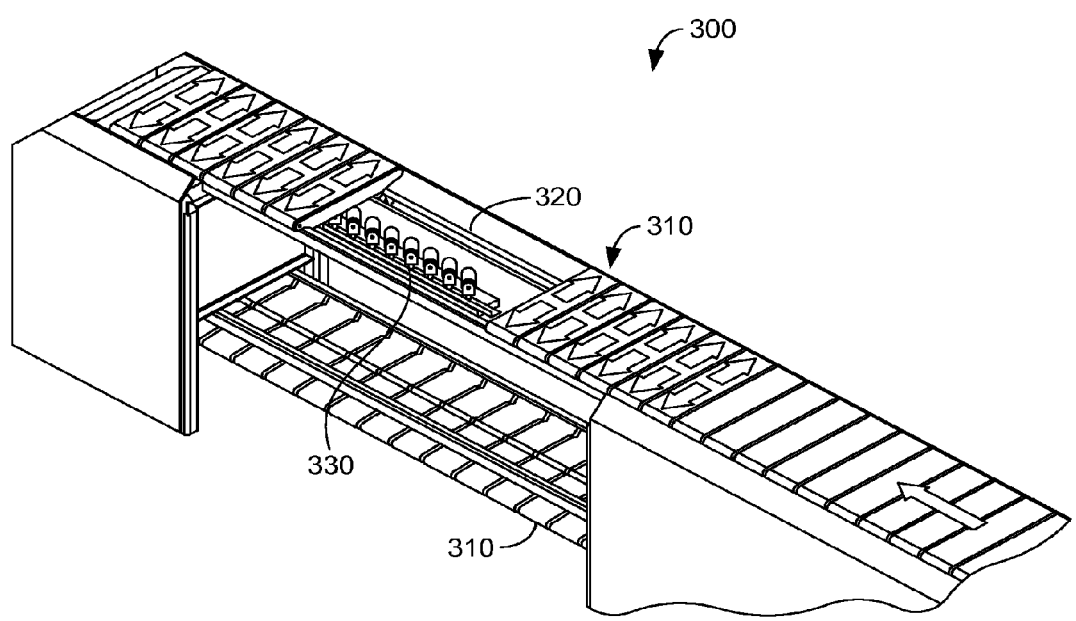
FIG. 3 depicts tracks of the cross-belt system and the discharge directions of palettes, in accordance with embodiments of the invention.

FIG. 3 depicts tracks 320 of the cross-belt system 300 and the discharge directions 310 of palettes, in accordance with embodiments of the invention. The frame of the cross-belt system 300 may be removed to show the internal mechanical components. These mechanical components include a track 320 (e.g., a chain) for the palettes and a series of rollers 330.

The track 320 provides a guide for the movement of the interlocking palettes that form the conveyor belt. The track 320 runs from end to end in the cross-belt system 300. The track 320 also curves at each end of the cross-belt system 300. In some embodiments, the track 320 ends at each of the least two sprockets. The track 320 may be include a top member and a bottom member of the cross-belt system 300.

When the palettes reach the end sprockets, the palettes unlock and curve around the sprocket until the palettes reach the bottom of the cross belt system. At the bottom of the cross-belt system 300, the palettes interlock and continue until reaching the opposite end of the cross-belt system 300. At the opposite end, the palettes unlock as they traverse the sprockets on the other end. Upon completing the curve back to the top of the cross-belt system 300, the palettes interlock and continue along the track 320. The palettes continue looping around the track 320 until item processing is completed by the cross-belt system 300. In one embodiment, the interlocking of the palettes is from magnetic tension of magnetic material fabricated into the patterns along the adjacent sides of the palettes. In other embodiments, the interlocking is based on mating dowels and chambers found along the sides of the palettes. In further embodiments, the interlocking is based on the alignment of teeth patterns found along the sides of the palettes.

The series of rollers 330 are positioned below the palettes. When an item on one or more palettes should be discharged, the series of rollers 330 are engaged to move the item on the palettes by translating motion to one or more idler rollers that move the belt of the palette. In one embodiment, the series of rollers 330 lift in a vertical manner to cause the palette's belt to discharge the item. The series of rollers 330 may be angled at a specific degree based on the direction of discharge. In one embodiment, the series of rollers 330 is placed at +45° or −45°. When the series of rollers 330 are lifted in sequence, they engage the palettes above. Upon engaging the palettes, the items on the palettes are discharged in a direction perpendicular to the item flow on the conveyor belt and toward a loading area (e.g., a packaging station). In some embodiments, the items are discharged leftward or rightward, depending on the angle (e.g., ±45°) of the series of rollers 330. When the controller sends a signal to the series of rollers 330, the signal may include the number of rollers in the series of rollers 330 to be engaged and the length of time for the lift operation. Accordingly, the controller may trigger a lift-up operation on the series of rollers 330. The controller decides how many palettes will move and for how long. In some embodiments, package size and weight influence the number of palettes and the length of time selected by the controller.

In one embodiment, the series of rollers 330 are not motorized to initiate movement of the rollers or to move the palette belt. It is the forward movement of the conveyor belt, as caused by a driving chain along the track 320, that causes the palettes to slide in one transversal direction or the other when the series of rollers 330 engage the palettes. In response to the lift from the series of rollers 330, the palettes discharge the item on the palettes to the offloading area. Accordingly, the only motorized part of the diverter may be the rising and lowering of the series of rollers 330.

In one embodiment, the rollers may be configured to change angles in response to signals from the controller of the cross-belt system. The angles may be changed by engaging or disengaging a solenoid or actuator connected to the rollers. A controller may transmit a signal to rollers that engage or disengage the pin.

Figure 4:
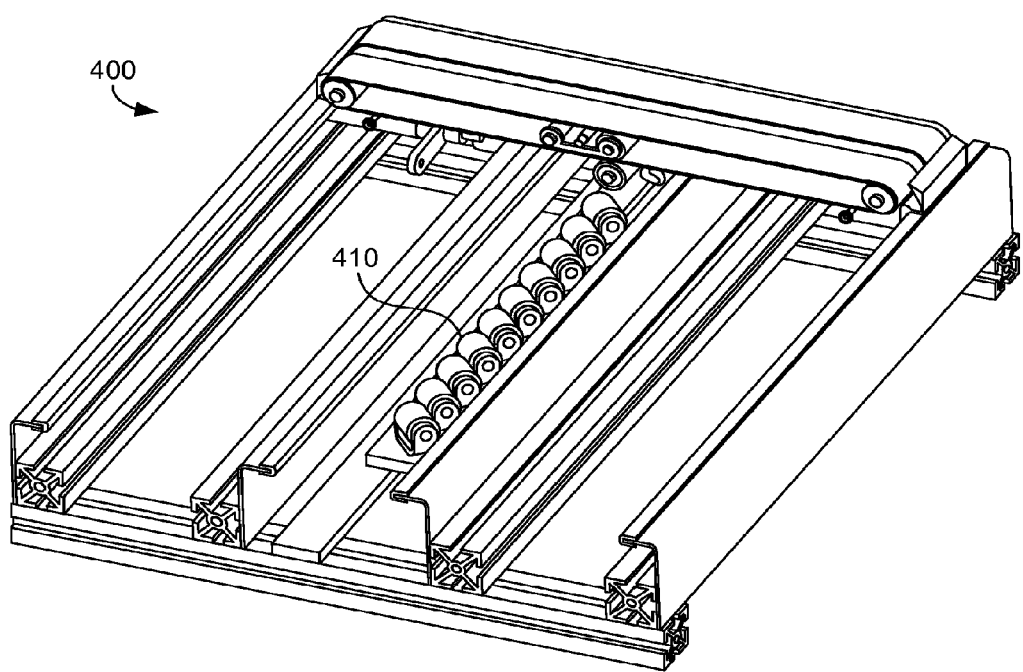
FIG. 4 depicts a series of rollers within the cross-belt system, in accordance with embodiments of the invention.

FIG. 4 depicts a series of rollers 410 within the cross-belt system 400, in accordance with embodiments of the invention. The series of rollers 410 provide translational movement to the palette. A controller may trigger the series of rollers 410 to switch orientation to among +45°, −45°, or some angle less than 45 degrees. The trigger may engage or disengage a solenoid to cause the switch. The switch is automatically performed, without user intervention, based on item destination, expiration, or any other property of the item on the conveyor belt, etc.

In another embodiment, the rollers may be configured with at least one additional set of rollers. Each set of rollers may be preconfigured for a predetermined offload direction.

The controller may engage the set of rollers that is configured for the direction of the selected offloading area for the items.

Figure 5:
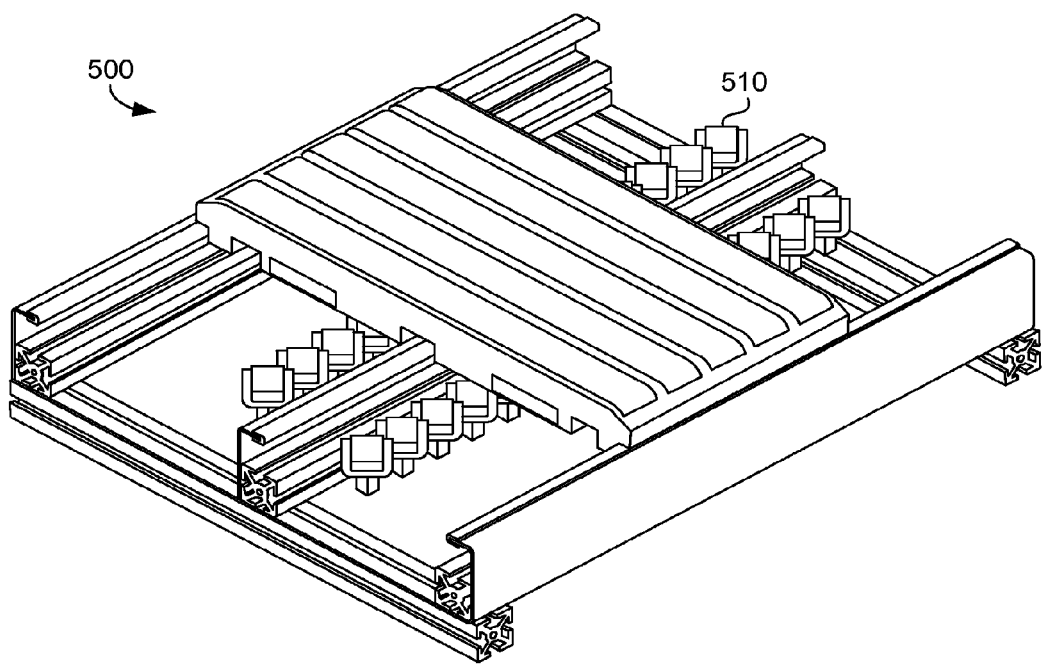
FIG. 5 depicts another configuration for the series of rollers within the cross-belt system, in accordance with embodiments of the invention.

FIG. 5 depicts another configuration for the series of rollers 510 within the cross-belt system 500, in accordance with embodiments of the invention. The cross-belt system may have at least two sets of rollers 510. The selected angle of the rollers 510 may switch based on a signal from the controller.

In one embodiment, the rollers 510 are angled in the same offload direction. In this configuration, the dual series of rollers 510 may provide more driving force to the palette. This may be ideal when processing heavy items on the cross-belt system. The controller may be configured to switch the angle of the rollers when a different offload direction is required to process an item.

In another embodiment, the rollers 510 are angled in different offload directions. One set of rollers 510 may be oriented at +45°. The other set of rollers may be oriented at −45°. In turn, the rollers 510 that are oriented in the direction of the offloading area selected by the controller are lifted to engage the palette. Accordingly, this configuration allows selection of the offload direction without the need to change the angle direction for the rollers 510.

In further embodiments, the rollers 510 may be staggered. The staggered rollers 510 may be used alternatively. This allows both rollers to be used but only about half the time. Staggering of rollers may increases the life of the rollers 510 by reducing wear and tear on the rollers 510. The staggered rollers 510, in other embodiments, include a primary set of rollers and a back-up set of rollers 510. The back-up set of rollers 510 may be used only when the primary set of rollers 510 fail or when maintenance is necessary. In the staggered configuration, selection of offload direction may require the controller to signal the rollers 510 to change the angle direction depending on the selected offload location for the item.

As explained above, the diverter rollers below the palette provide the driving motion to a belt of the palette. Each palette may include a pulley system that drives the belt in response to contact from the diverter rollers below. The pulley system may include several rollers that translate the lifting force of the rollers to the movement of the gears and the belt of the palette.

Figure 6:
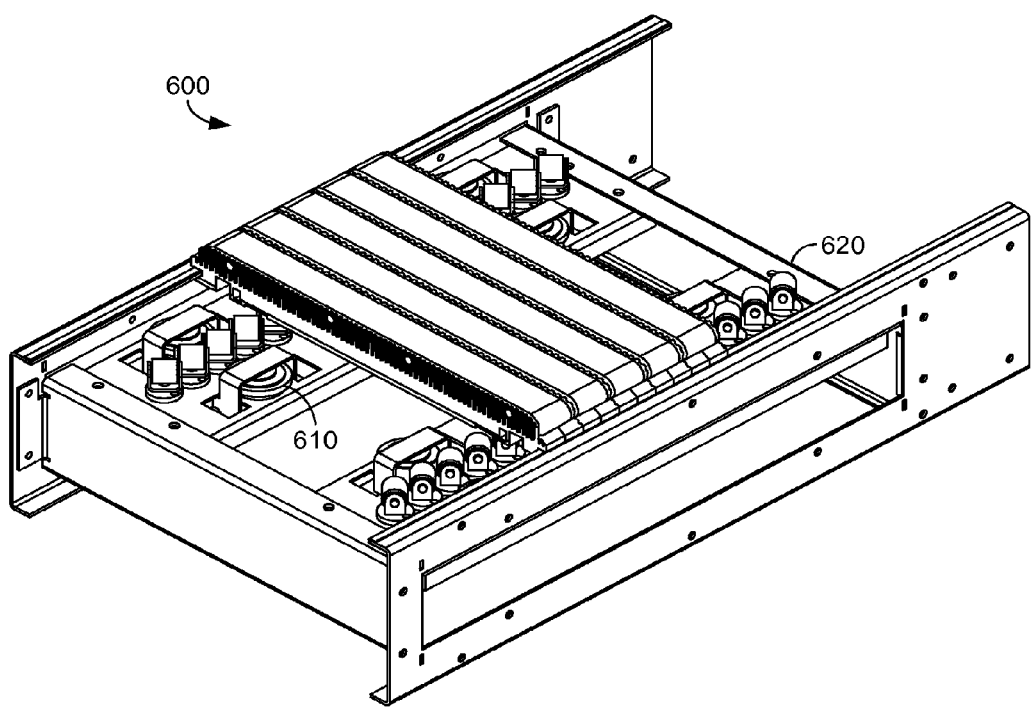
FIG. 6 depicts an alternate configuration of the diverter rollers, in accordance with embodiments of the invention.

FIG. 6 depicts an alternate configuration of the diverter rollers 620, in accordance with embodiments of the invention. The cross-belt system 600 has a diverter component. The diverter component is configured to manipulate the palette belt. The diverter component, in one embodiment, includes a disc 610 and diverter rollers 620.

The disc 610, in one embodiment, is an air diaphragm. In response to a control signal from a controller, pneumatics are engaged to fill the diaphragm. The disc 610, in turn, causes the diverter rollers 620 to lift. The disc 610 is positioned below the diverter rollers 620. The diverter rollers 620 move upward or downward in response to the signal from the controller. Accordingly, the diverter rollers 620 engage the palette to divert items from the cross-belt system.

In one embodiment, the diverter rollers 620 include a series of rollers. The diverter rollers 620 switch angles (e.g., any between +45 and −45) based on a signal received from a control that actuates a motor connected to the diverter rollers.

In certain embodiments, the palettes are modular and may include several rollers that are used to transmit drive motion to the palettes. The belt of the palette is configured to rest on the rollers. Additionally, the palettes are interlocked to form the conveyor belt of the cross-belt system.

Figure 7:
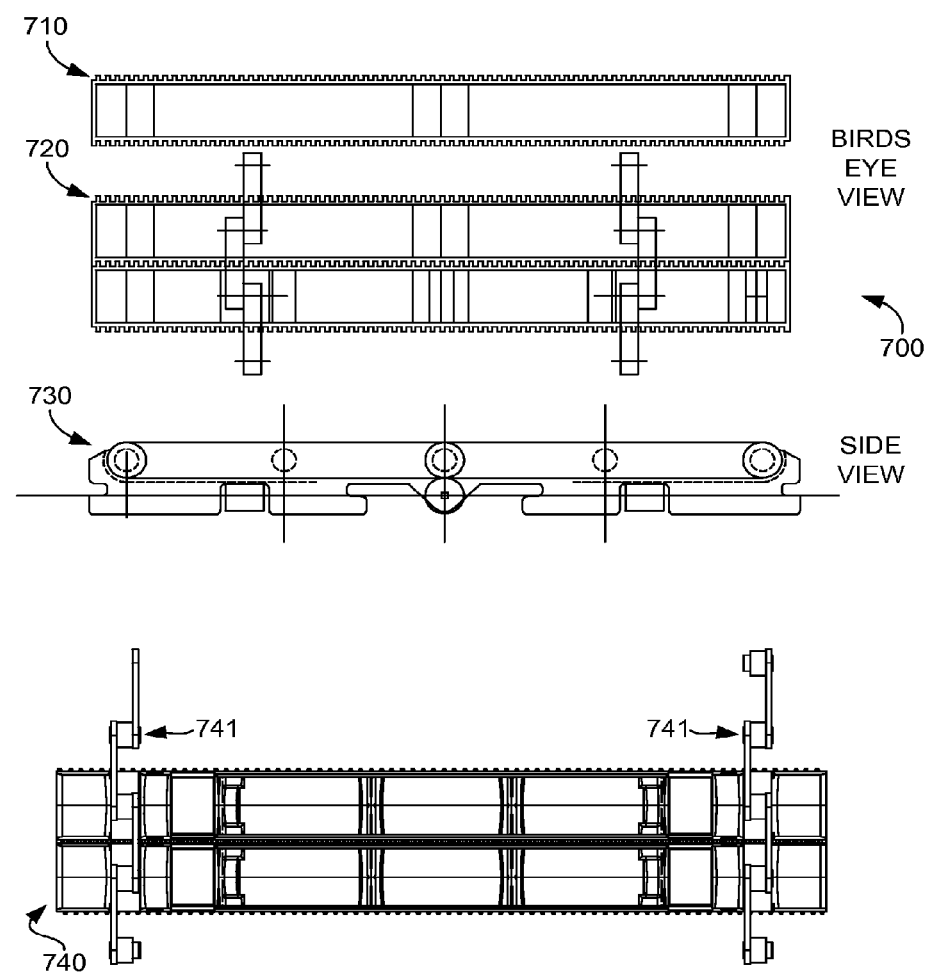
FIG. 7 depicts a top, side, and bottom view of the palettes, in accordance with embodiments of the invention.

FIG. 7 depicts two top views 710 and 720, a side view 730, and a bottom view 740 of the palettes 700, in accordance with embodiments of the invention. The top view 710 and top view 720 show the interlocking pattern of the palettes. The interlocking patterns are similar to teeth of a zipper or teeth of a comb, in some embodiments. The top view 710 shows a configuration with one palette having the interlocking patterns on two sides. The top view 720 shows a configuration with two interlocked palettes. The interlocked palettes are mated together with a support member (e.g., dowel or chain segment) that is configured to mate with a chamber of the adjacent palette.

The side view 730 shows the position of the end roller and idler rollers in relation to the belt of the palette. A track and guide for the belt are illustrated in side view 730 along with a curve that the belt makes around the edges of the palette. The rollers include end rollers and idler rollers. The end rollers provide motion to the palette belt, which discharges items to the offloading areas. In one embodiment, the palette includes at least two end rollers located at each end of the palette. At least two idler rollers may be provided towards the middle of the palette. The idler rollers may be position above and below the belt. The idler rollers are parallel to each other and pinch the belt. The idler rollers translate motion to the end rollers and the belt of the palette. The idler rollers are passive elements (e.g., not motorized) of the palette. In one embodiment, the end rollers are motorized. In other embodiments, the end rollers are not motorized.

The bottom view 740 shows the position of the chain 741 that connects each of the palettes to the cross-belt system. The chain connects to chambers under each of the palettes. The chambers, in one embodiment, are located on each end of the palette and are placed after the end rollers. In other words, the chambers for the palettes are located between the end rollers and the idler rollers.

The chambers receive the chain and attach the palette to the cross-belt system. The palette may include four idler rollers. The idler rollers are located between the two chambers for a chain on each side of the palette. The idler rollers are provided to receive contact in response to vertical lift provided to a series of rollers that engage the palettes from below. The idler rollers transmit drive motion to the belt of the palettes via the series of rollers below the palette. The idler roller eliminates side-loading of the belt, which would arise from contact of an angled diverter roller in the series of rollers with the belt on the palettes. Without the idler roller, the diverter roller contact with the belt may cause the belt to slip off laterally and to wear faster.

In certain embodiments, the palettes form the conveyor belt of the cross-belt system. The palettes interlock along particular segments of the track in the cross-belt system. The palettes unlock along other segments (e.g., sprocket segments). Accordingly, the palettes comprise narrow width chambers that are arranged perpendicular to the product flow direction with an interlocking pattern.

Figure 8:
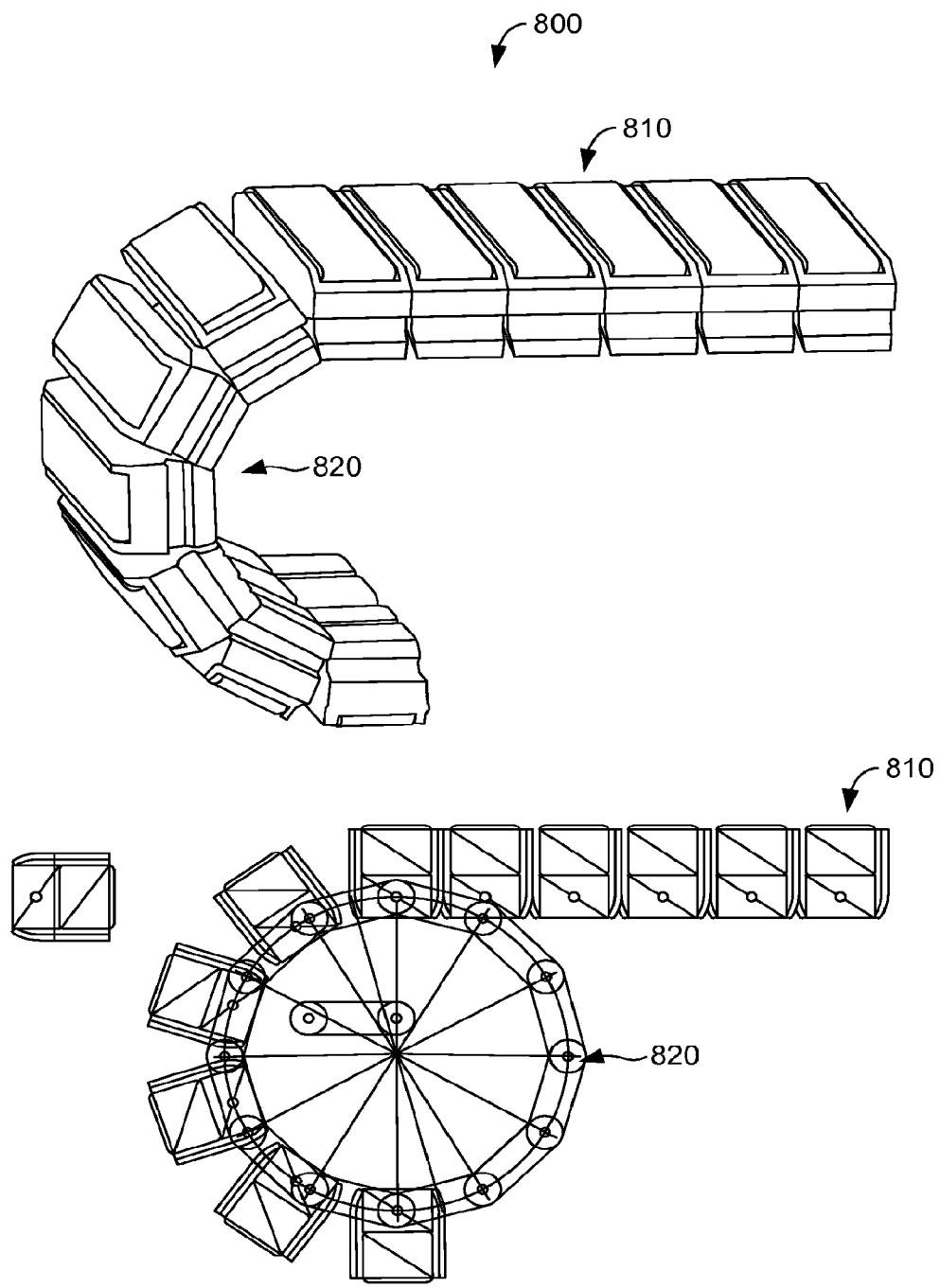
FIG. 8 depicts curvature of interlocking palettes at the ends of the cross-belt system, in accordance with embodiments of the invention.

FIG. 8 depicts curvature of interlocking palettes 810 at the ends of the cross-belt system 800, in accordance with embodiments of the invention. The palettes 810 of the conveyor belt unlock at the sprocket 820. After traversing this portion of the track, the palettes interlock and continue along the track.

The palettes unlock and interlock twice during each complete loop of the track in the cross-belt system. A first unlocking of palettes takes place on the top side of the cross-belt system 800 as the palettes move from top to bottom. A second unlocking takes place on the bottom side of the cross-belt system 800 as the palettes transition from bottom to top. Likewise, a first locking of palettes takes place on the top side of the cross-belt system 800 after the palettes move from bottom to top. A second locking takes place on the bottom side of the cross-belt system 800 after the palettes transition from top to bottom.

In one embodiment, the palettes may be uniform in size. In other embodiments, the palettes may vary in size. The width of the palettes may be configurable and may include sizes that range from one inch to six inches. As the palettes curve along the ends of the cross-belt system, the interlocking pattern is undone.

Figure 9:
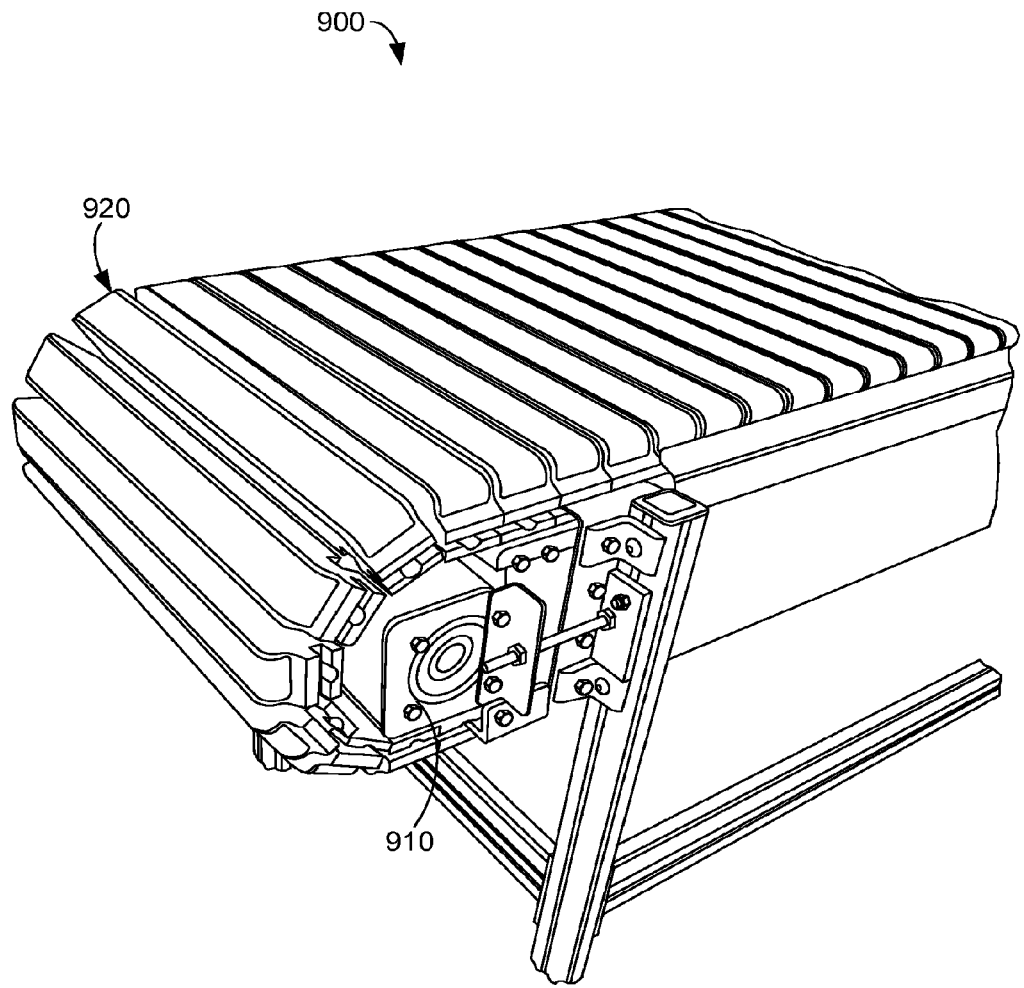
FIG. 9 depicts a curvature of palettes in the cross-belt system, in accordance with embodiments of the invention.

FIG. 9 depicts a curvature of palettes in the cross-belt system 900, in accordance with embodiments of the invention. The palettes 920 curve along a sprocket 910 (at each end) and unlock as they rotate from a top position to a bottom position. The palettes 920 lock as they continue along the bottom of cross-belt system 900.

In certain embodiments, the cross-belt system comprises: an endless conveying path, a capturing component, and a control. The endless conveying path has a first side and a second side. The first side of said endless conveying path is generally opposite the second side. The endless conveying path is formed by interlocking palettes. The capturing component is proximate to the conveying path. The capturing component obtains information about items, including expiration date, from the items on the palettes of the endless conveying path. The control is operable to cause the palettes forming the endless conveying path to move items along said conveying path. Also, the control is operable to discharge items from said palettes as said palettes are continuously moved along said conveying path based on, among other things, item expiration date or required destination.

In one embodiment, the palettes have belts that are moveable in at least two directions toward the selected offloading area. The palette belts are movable to discharge articles at said selected offloading area while said interlocking palettes maintain continuous movement along said conveying path. In one embodiment, the palette belts are moveable orthogonally to the conveying path. The palette belts are moveable by compression of the belt between rollers within the palettes in response to lift that is received from a series of passive rollers below the palettes as the palettes travel along the conveying path.

The sprocket and track of the cross-belt system allow the palettes to curve along the ends of the conveyor belt. The sprockets allow the palettes to rotate from the top of the cross-belt system to the bottom of the cross-belt system. The palettes are attached to chains of the track and move along with the motion of the chains.

Figure 10:
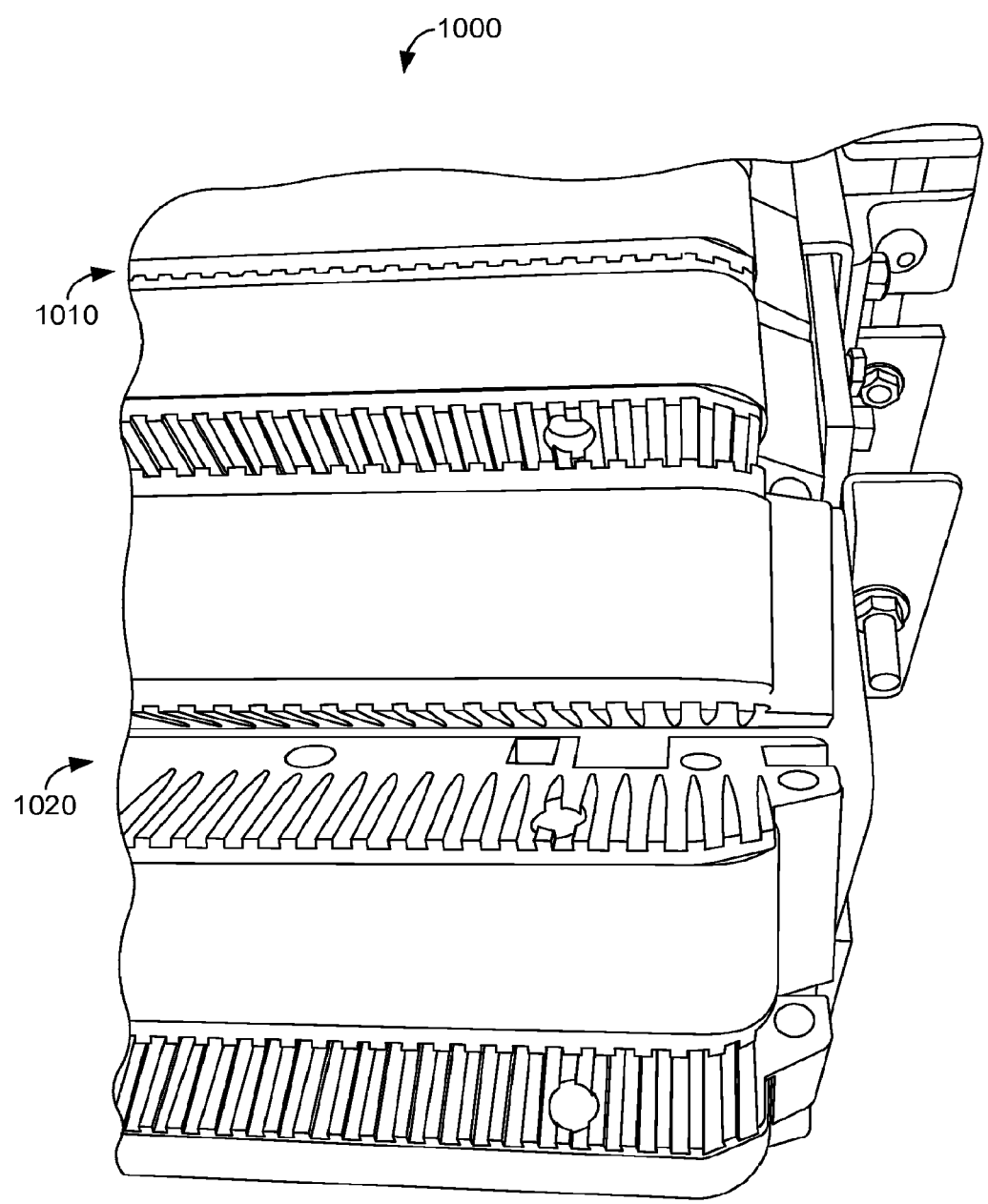
FIG. 10 depicts the unlocking of palettes of the cross-belt system, in accordance with embodiments of the invention.

FIGS. 10-14 show the palettes and chain of the cross-belt system. FIG. 10 depicts the unlocking 1020 of palettes of the cross-belt system, in accordance with embodiments of the invention. The palettes may be in a locked position 1010 or an unlocked position 1020. The locked position 1010 keeps adjacent palettes together as they move along the cross-belt system. The unlocked position 1020 allows the palettes to move around the sprocket and interlock on the underside of cross-belt system.

Figure 11:
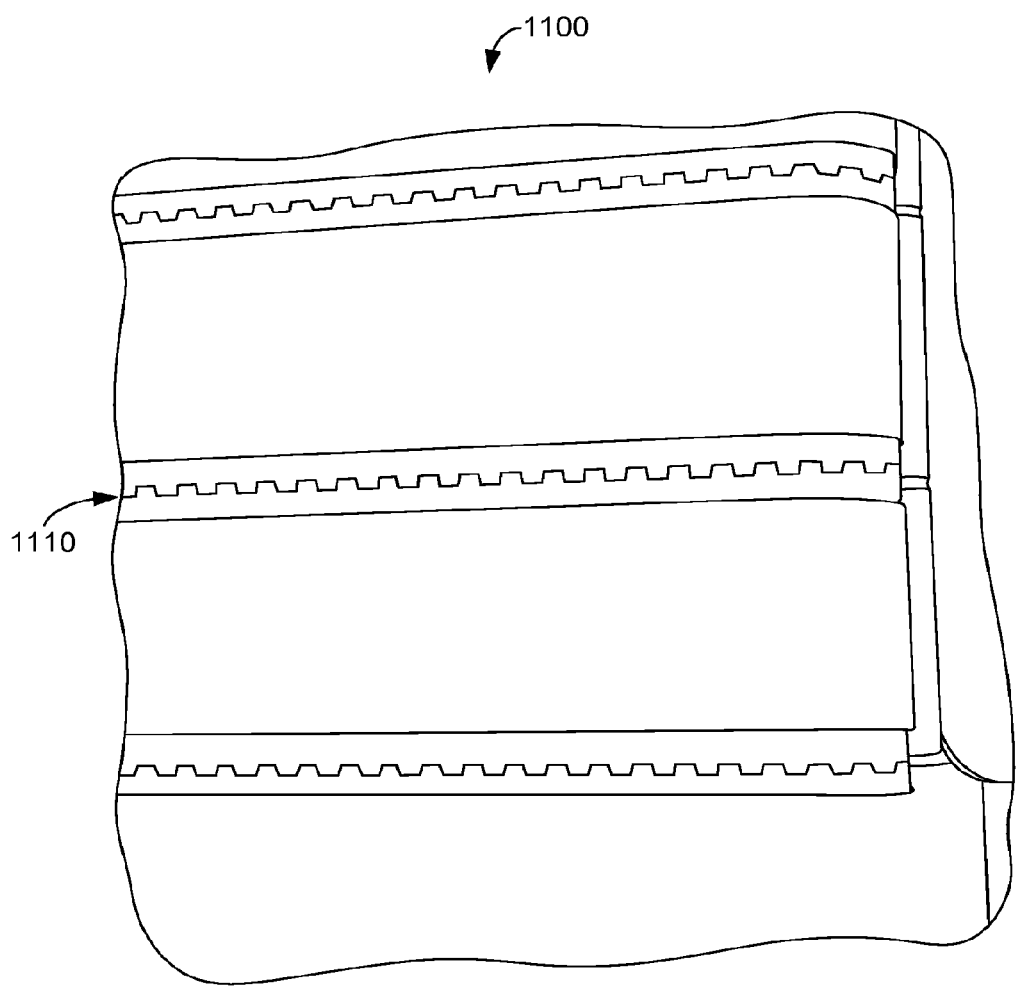
FIG. 11 depicts locked palettes of the cross-belt system, in accordance with embodiments of the invention.

FIG. 11 depicts locked palettes of the cross-belt system, in accordance with embodiments of the invention. The palettes are locked together as they move along the topside or the bottom side of the cross-belt system. The locked patterns 1110 prevent small items from falling between the palettes of the conveyor belt.

Figure 12:
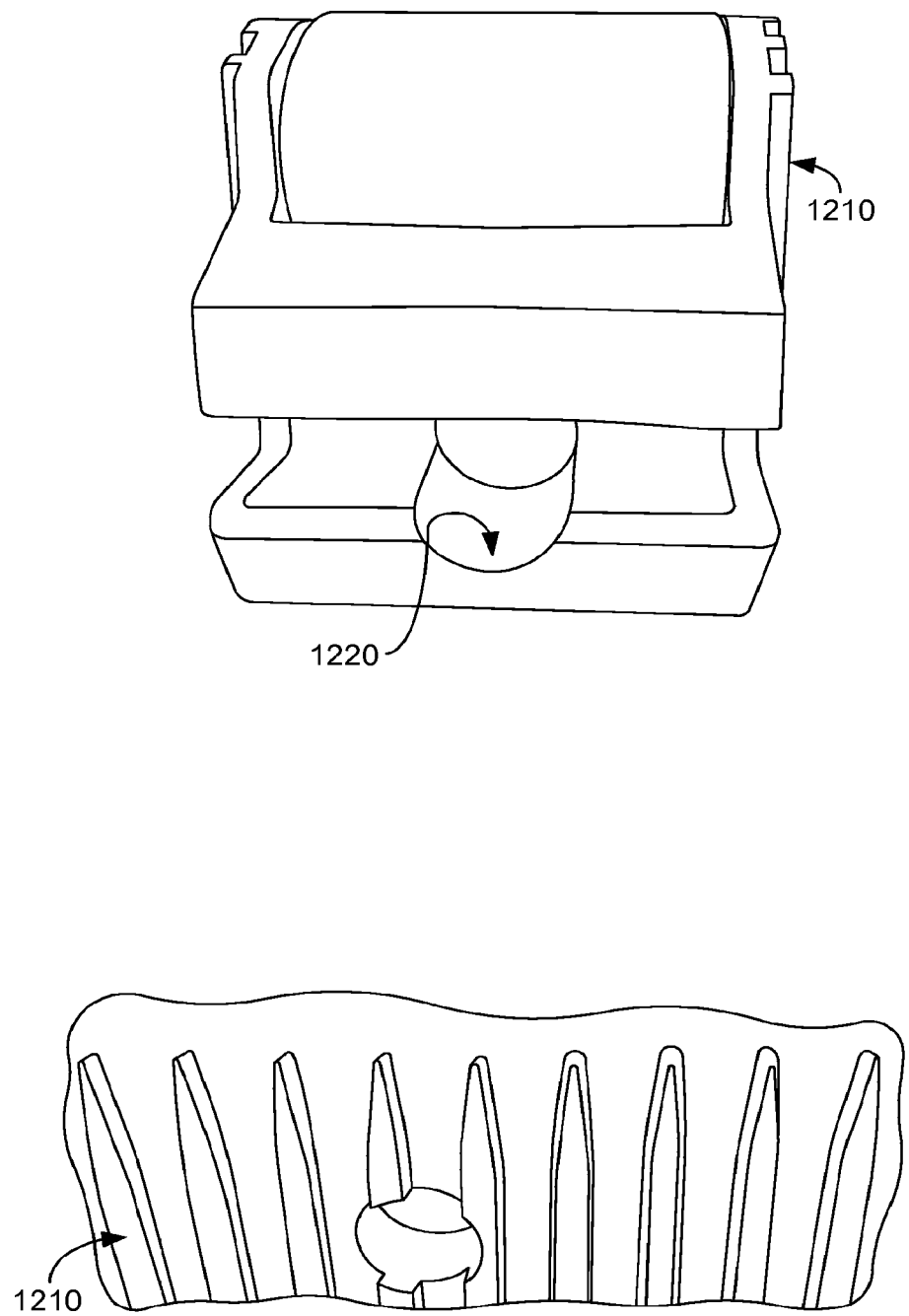
FIG. 12 depicts the chain engagement portion of the palette and one alignment pattern of the palettes in the cross-belt system, in accordance with embodiments of the invention.

FIG. 12 depicts one alignment pattern 1210 of the palettes and the chain engagement portion 1220 of the palette in the cross-belt system, in accordance with embodiments of the invention. The alignment pattern 1210 of the palettes may be part of the interlocking pattern. The alignment pattern 1210 may include a series of peaks that are positioned to mesh with a series of troughs on each adjacent palette. The alignment pattern also enables the palettes to realign and interlock at both the top side and bottom side of the cross-belt system. The chain engagement portion 1220 attaches the palettes to part of a track of the cross-belt system. In at least one embodiment, the chain engagement portion 1220 of the palette may include a void (e.g. pin hole) that receives a pin to attach to a track and chain of the cross-belt system. Accordingly, the pin attaches to the palettes and the chain that is moving along the track.

Figure 13:
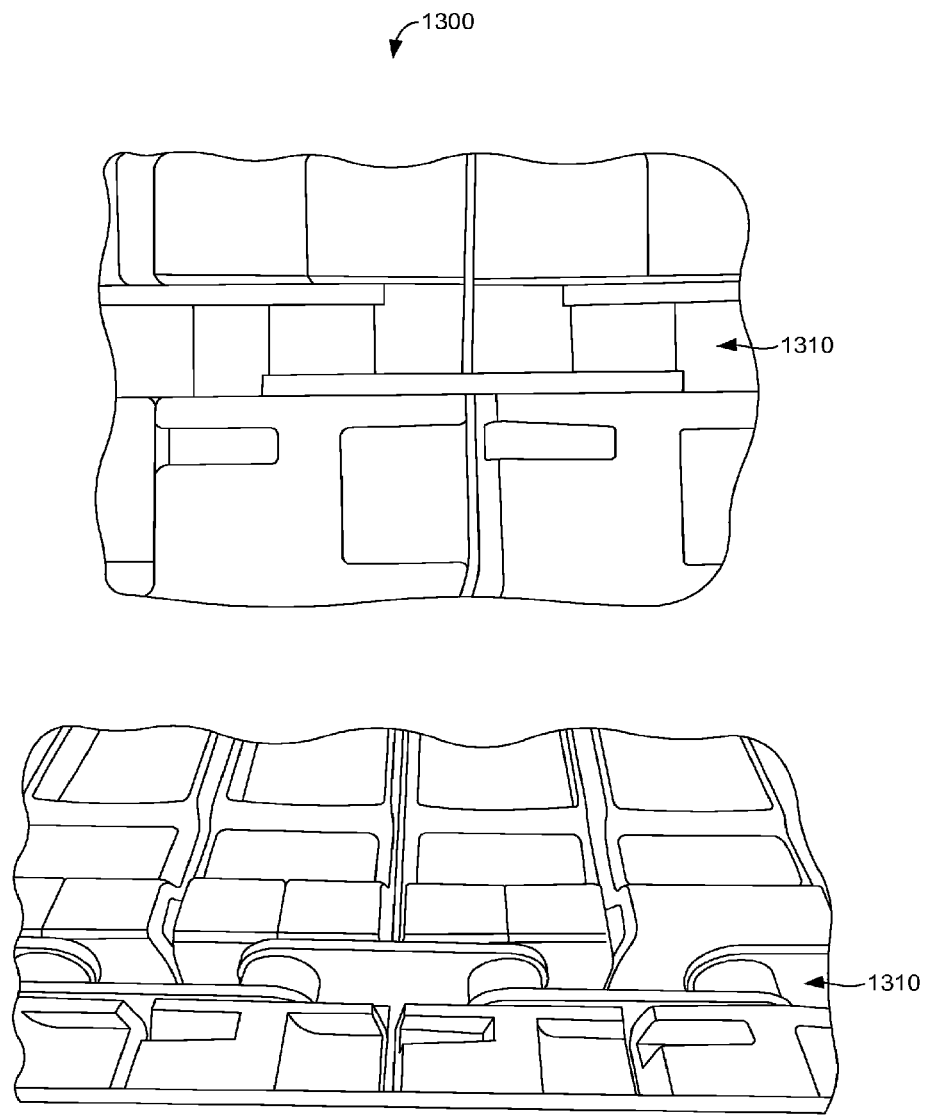
FIG. 13 depicts links of the chain attached to the palettes, in accordance with embodiments of the invention.

FIG. 13 depicts links of the chain 1310 attached to the palettes, in accordance with embodiments of the invention. The chain 1310 of the cross-belt system attaches to the palettes and moves the palettes along the track. The chain 1310 includes a plurality of links that are interconnected. In one embodiment of the invention, each of the links of the chain 1310 is attached to at least one palette. The links are attached to the chamber and chain engagement portions of each palette.

Figure 14:
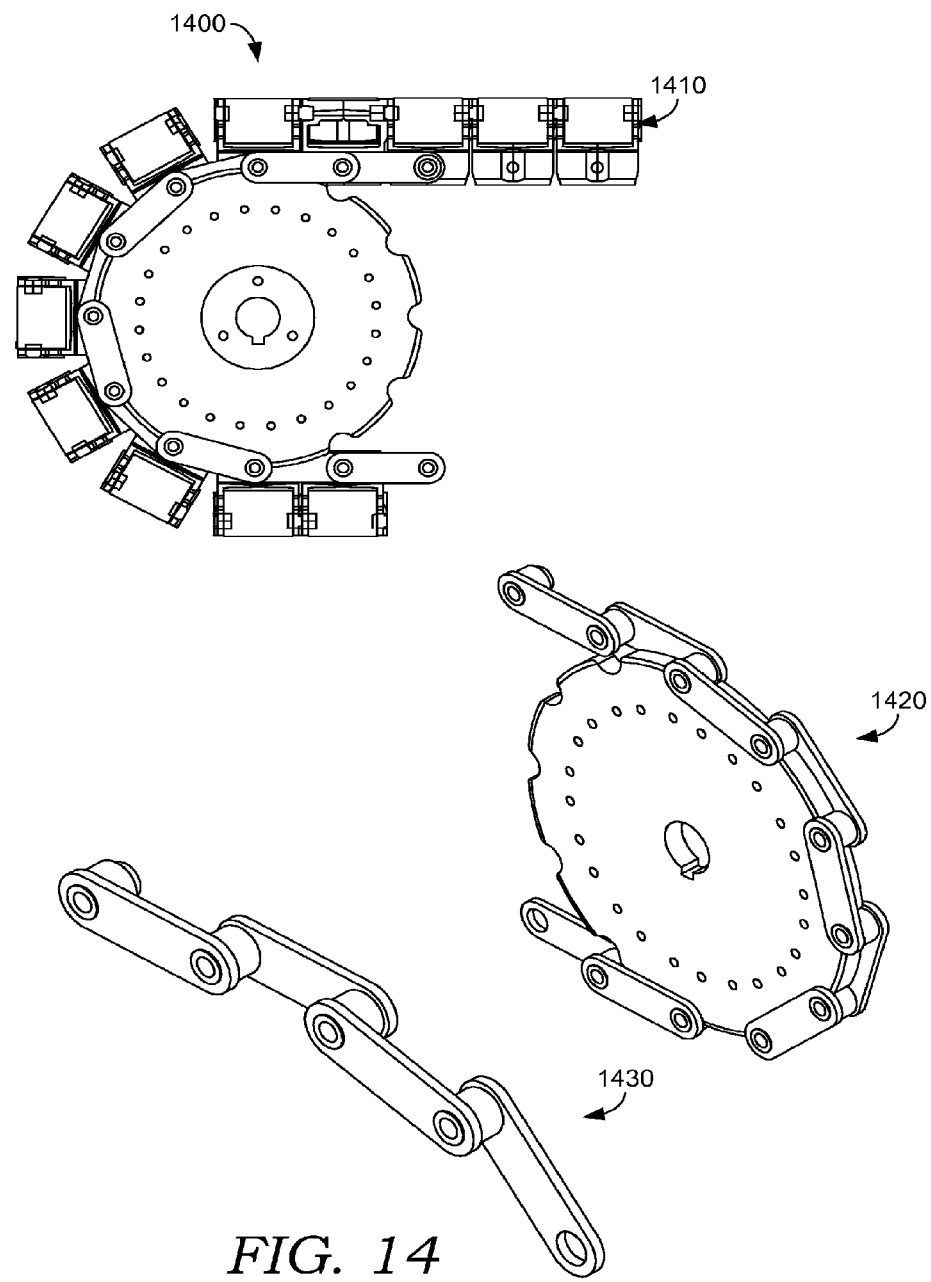
FIG. 14 depicts palettes connected to the chain that traverses the sprockets of the cross-belt system, in accordance with embodiments of the invention.

FIG. 14 depicts palettes 1410 connected to the chain 1430 that traverses the sprockets 1420 of the cross-belt system 1400, in accordance with embodiments of the invention. The chain 1430 is completely on the sprocket and moves along as the sprocket 1420 turns. The sprocket 1420 turns in a forward direction based on signals received from a controller. The controller signals the motor of the sprocket to turn in a specified direction. The controller, in certain embodiments, signals the motor to turn off or stop moving the sprocket 1430.

The links of the chain 1430 in the cross-belt system are positioned to receive the teeth of the sprockets. The links of the chain 1430 may include notches that receive the teeth. Upon rotation of the sprocket 1420, the teeth engage additional notches in the links of the chain 1430. The links also are configured to attach to the palettes 1410. Each link segment attaches to a palette 1410.

In one embodiment, the links of the chain 1430 are modifiable to alter the size (length) of the palette or the conveyor belt. The link notch size may be increased to accommodate larger palettes (e.g., wider palettes). Additionally, the number of links may be increased to lengthen the chain 1430 and to have a longer cross-belt system 1400. Alternatively, the number of links of the chain 1430 may be reduced to shorten the chain 1430 and to assemble a shorter cross-belt system 1400.

In some embodiments, the cross-belt system is configured to sort items. The items are loaded onto a moving conveyor belt. The cross-belt system obtains information about the items on the conveyor belt. In turn, the cross-belt system selects one or more items for discharge. At an appropriate offloading location, the cross-belt system discharges the selected item(s).

Figure 15:
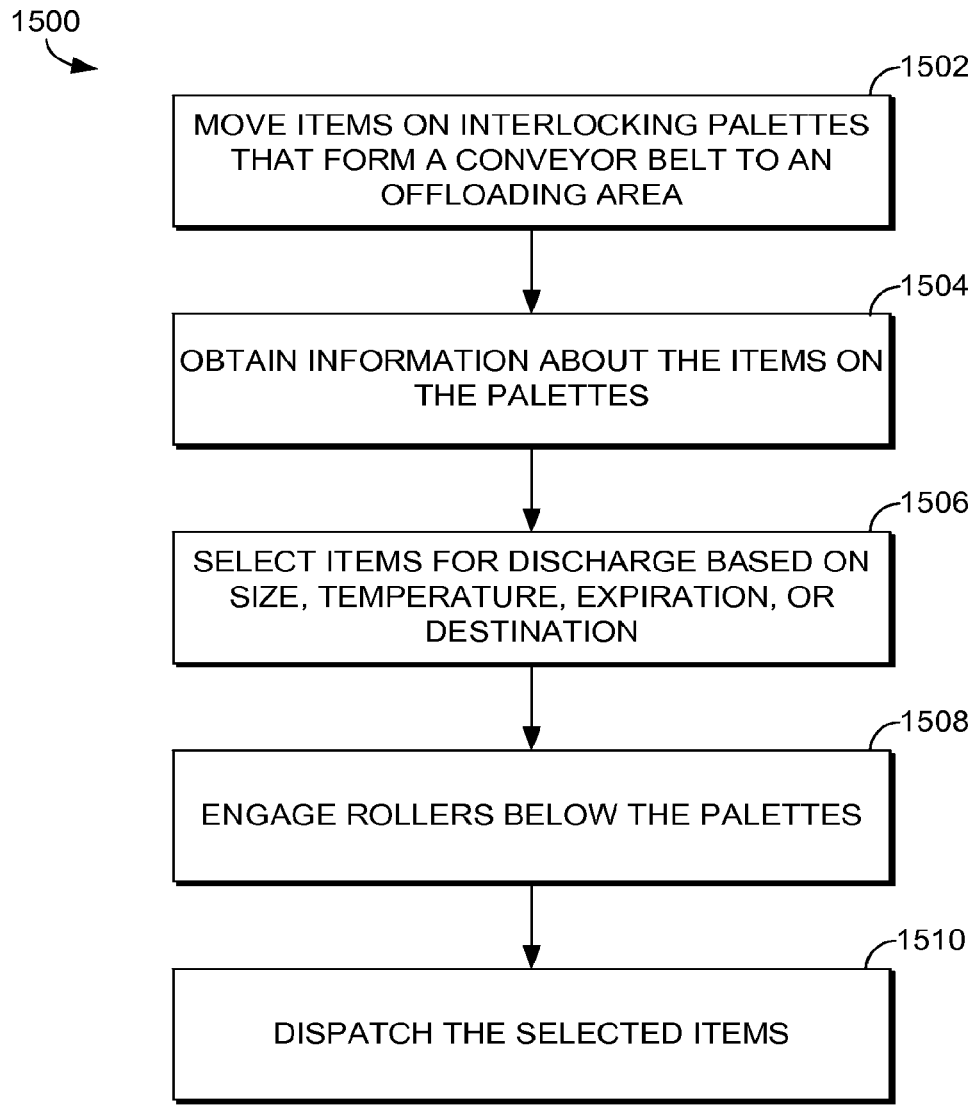
FIG. 15 depicts a logic diagram for sorting items on the cross-belt system, in accordance with embodiments of the invention.

FIG. 15 depicts a logic diagram 1500 for sorting items on the cross-belt system, in accordance with embodiments of the invention. The cross-belt system may initialize the sorting method upon receiving an item. In step 1502, the cross-belt system moves items on palettes to an offloading area. The palettes are interlocked and may carry one or more items, in one embodiment. The cross-belt system obtains information on the one or more items, in step 1504. The information may be obtained from an item database. In some embodiments, the cross-belt system may obtain required information, such as, for example, price, cost, and/or sort destination, before continuing with the sorting method. In other embodiments, the cross-belt system may obtain additional and/or optional information to aid in the accuracy and efficiency of the sorting method. In turn, the cross-belt system, in step 1506, selects an item for discharge based on, but not limited to, among other things, size, temperature, expiration date, or required destination of the item. The cross-belt system engages one or more rollers below the palettes based on an offloading area identified for the selected item, in step 1508. A processor in the cross-belt system triggers the rollers to engage with the palette. The cross-belt system discharges the selected one or more items in step 1510.

In one embodiment, a system for diverting one or more items of a transaction to a receiving area designated for said transaction is provided. The system includes a feed component configured to transport the one or more items to an identification device and to a diversion belt. The system also includes an identification device configured to identify each of the one or more items comprising the transaction and to select one of a plurality of receiving areas for the transaction, wherein the selected receiving area is available. In embodiments, the system includes a diversion belt configured to transport each of the one or more items to the selected receiving area. And, the system also includes a plurality of receiving areas, wherein each of the plurality of receiving areas may be selected by the identification device for a separate transaction, in embodiments.

In another embodiment, a check-out apparatus for automated sorting of goods corresponding to a purchase transaction is provided. In embodiments, the check-out apparatus includes a first belt for receiving goods and having a first barrier for separating the first belt from a merge belt, wherein the first barrier controls the flow of goods from the first belt to the merge belt. The apparatus also includes a second belt for receiving goods and having a second barrier for separating the second belt from the merge belt, wherein the second barrier controls the flow of goods from the second belt to the merge belt. One or more sensors are configured to detect goods received by one or more of the first belt and the second belt of the check-out apparatus. The merge belt of the apparatus receives goods from the first belt when the first barrier is set to an open position and/or receives goods from the second belt when the second barrier is set to an open position. The merge belt further transports goods to an identification zone wherein an identification device automatically identifies the goods when said goods are within the identification zone. A database, coded divider, or operator may select a destination for the goods in one embodiment. In other embodiments, the identification device selects a receiving bay to receive the goods. The check-out apparatus includes a third belt for receiving the goods from the merge belt and for diverting goods to the selected receiving bay. The one or more receiving bays of the check-out apparatus are configured to receive goods from the third belt, as selected by the identification device.

In yet another embodiment, a method for diverting items in a transaction to a receiving area is provided. In embodiments, the method includes transporting one or more items received on a feed belt, the one or more items comprising one purchase transaction. The one or more items comprising the purchase transaction are identified during transport. And, upon identification, the purchase of each of the one or more items comprising the purchase transaction is processed. The method further includes determining to dispatch the one or more items comprising the purchase transaction to a selected receiving area and dispatching the one or more items to the selected receiving area.

Figure 16:
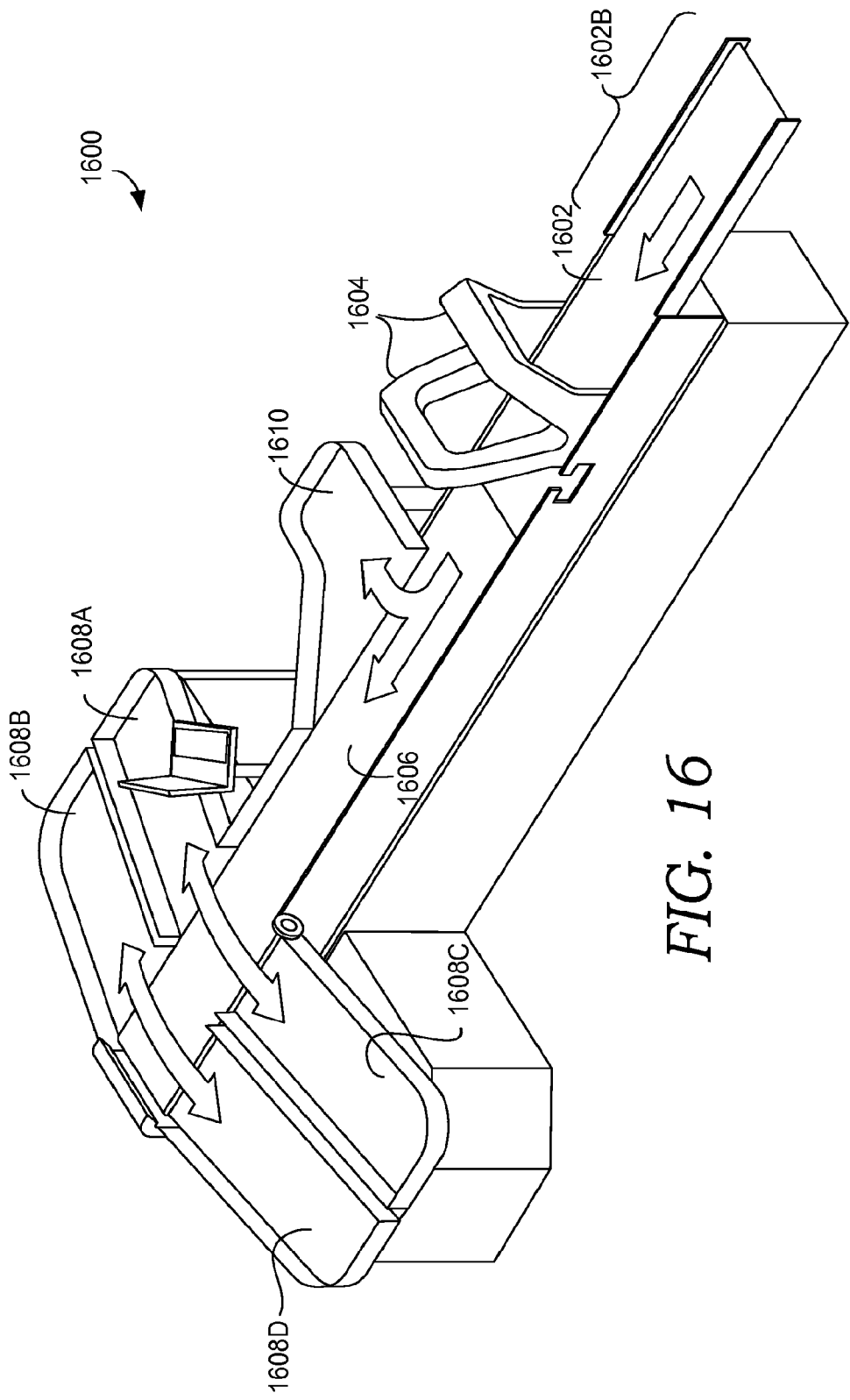
FIG. 16 depicts a front view of an exemplary system for diverting one or more items of a transaction to a designated receiving area, in accordance with embodiments of the invention.

FIG. 16 depicts a system 1600 for diverting one or more items of a transaction to a designated receiving area, in accordance with embodiments of the invention. The system 1600 includes a feed component 1602, an identification device 1604, a diversion belt 1606, and at least one receiving area 1608A, 1608B, 1608C, and 1608D or destination. Further embodiments may include any number of identification devices, diversion belts, receiving areas or destinations, and/or exception areas 1610. Embodiments may include a plurality of feed components, each corresponding to different customers and/or separate transactions. The systems depicted herein are only a few examples of suitable systems and configurations and are not intended to suggest any limitation as to the scope of use or functionality of the invention. Neither should the system be interpreted as having any dependency or requirement relating to any one or combination of components or features illustrated herein. Although some components are shown in the singular, they might be plural. Additionally, although some components are depicted as plural in occurrence, in actuality, they may be singular.

The feed component 1602 is configured to receive and transport one or more items corresponding to a purchase and/or transaction. The feed component 1602 may be a conveyer belt or cross belt, for example. Items may be placed onto the feed component 1602 manually by a user or automatically, by mechanical means, for example. Generally, items may be grouped into separate and/or discrete transactions, each transaction corresponding to a customer, a shopping list, an order, and/or an electronically submitted requisition (e.g., a previous or requested purchase of goods and/or services). In some embodiments, the feed component 1602 initiates transport of the items in response to an item being placed on the feed component 1602 (e.g., detection of item weight, detection of the motion of placement of an item, for example). For instance, the feed component 1602 may automatically detect the presence of an item, or the receipt of an item, and react by beginning to transport the item toward the identification device 1604. In another instance, the feed component 1602 may initiate transport mechanisms prior to receipt of an item when the feed component 1602 detects that a customer and/or a shopping cart is within a specified proximity to the feed component 1602, or is approaching the feed component 1602. For example, the feed component 1602 may detect a shopping cart and/or shopping basket labeled with an RFID tag and, in response to recognition of the RFID tag, may initiate transport mechanisms. In some embodiments, the feed component 1602 may include alternate or additional settings that enable the feed component 1602 to initiate transport in response to user input (e.g., user initiates check-out by pressing a "begin" input), which may or may not be in response to a user prompt. The feed component 1602 may initiate transport of one or more items in response to receipt or confirmation of an electronically submitted shopping list, purchase order, and/or requisition, in some embodiments. For example, the feed component 1602 may be configured to receive one or more items as fulfillment of a prior or prepaid purchase, order, or requisition, in some embodiments.

The feed component 1602 may include a portion 1602B for receipt of items to be purchased in a retail transaction or in response to a submitted shopping list. In one example, the portion 1602B juts out from a check-out stand or kiosk such that a shopping cart and/or a shopping basket may be easily accommodated next to and/or underneath the portion 1602B. The dimensions and/or configuration of the portion 1602B allow a purchaser and/or customer to easily remove items from the shopping cart and/or shopping basket and place said items onto the portion 1602B of the feed component 1602, for example. In some embodiments, the portion may be adjustable to accommodate various environmental settings and customer needs (e.g., wheelchair compatible). In some embodiments, the portion 1602B may include an RFID reader and/or a sensor for detecting the proximity and/or approach of a purchaser (e.g., motion sensor), shopping cart, shopping basket, items, and/or a loyalty card (e.g., frequent shopper card generally kept on a keychain). In other embodiments, the portion 1602B may include a sensor for detecting the proximity and/or approach of a purchaser based on the presence of a security feature corresponding to an item in a shopping cart or basket.

The feed component 1602 transports one or more items to an identification device 1604 and/or through an identification zone located proximate to the identification device 1604. The identification device 1604 is configured to identify each item received by the feed component 1602. Upon identification of an item, information, such as but not limited to pricing information, may be obtained and a purchase of the item may be processed, for example. In another example, upon identification of an item, shipping requirements, and/or legal restrictions on the sale of the item may be obtained and processed. Additionally, the identification device 1604 is configured to determine availability, and select one or more, of a plurality of receiving areas 1608A, 1608B, 1608C, and 1608D, wherein the selected receiving area 1608A, 1608B, 1608C, or 1608D is designated to receive each item comprising the transaction. In embodiments, the identification device 1604 selects a receiving area 1608A, 1608B, 1608C, or 1608D because it is available, is currently not in use, is not currently selected for a different transaction in a queue, and/or is currently free of items corresponding to other transactions. Accordingly, items belonging to a separate, discrete first transaction may be given a particular, selected receiving area (e.g., 1608A), while items belonging to a separate, discrete second transaction may be given a different, selected receiving area (e.g., 1608B), for example. In this way, items corresponding to different transactions are kept separate, preventing accidental co-mingling or cross-contamination.

The identification device 1604 identifies an item by detecting one or more of barcodes, dimensions, label(s), or logo(s), along with weight, color, packaging, shape, size, or a combination thereof, for example. In embodiments, the identification device 1604 may include or incorporate one or more of the following: Jade™ scanning device, a barcode scanner (e.g., UPC, ISBN), a three-dimensional scanner (e.g., contact or non-contact, active or passive), a camera, a weight and/or density scale, a thermal imager, conductive and/or capacitance measurement, a radio-frequency identification component (e.g., RFID), and/or any other techniques for the identification of items. In further embodiments, the identification device 1604 may be configured to identify an item using embedded data, a metadata tag, and/or digital fingerprinting (e.g., a spectrogram), etc. Additionally or alternatively, the identification device 1604 may utilize any number of databases (e.g., NSRL Reference Data Set) for the identification of electronic goods, services, and/or media (e.g., tangible goods, electronic goods).

In one example, the identification device 1604 uses a thermal imager to identify when an item may be categorized as a refrigerated and/or frozen good. In another example, the identification device 1604 uses a camera to capture an image of the item for identification by comparison to one or more databases of trademarks, insignia, logos, markers, and/or color combinations, as associated with goods and/or services. In yet another example, the identification device 1604 uses a camera to capture an image of the item for analysis and identification of recognizable letters, numbers, words, word sequences, and/or fonts in an effort to identify the item. The identification device 1604 may use a three-dimensional (3-D) scanner to identify the dimensions, shape, and size of an item in order to identify said item, in other examples.

The system includes a diversion belt 1606 configured to transport each of the one or more items to the selected receiving areas 1608A, 1608B, 1608C, and 1608D. The diversion belt 1606 may automatically transport the item to the selected receiving areas 1608A, 1608B, 1608C, and 1608D upon receipt of the item from the feed component 1602 or in response to selection by the identification device 1604 of one or more receiving areas 1608A, 1608B, 1608C, and 1608D for the transaction to which the item belongs, in various embodiments. In embodiments, the diversion belt 1606 may be a cross belt capable of transporting goods in three or more directions (e.g., forward, right, and/or left). The diversion belt 1606 may comprise a series of palette units or "cars" that run along a "track." Said units may work together to facilitate the forward and/or backward (e.g., a y-axis) direction of item flow. For example, the units may move forward to carry items received from the feed component 1602 toward receiving areas 1608A, 1608B, 1608C, or 1608D. Each unit of the diversion belt 1606 is further configured to convey items on the diversion belt 1606 in a direction that is perpendicular (e.g., x-axis) to the forward and/or backward motion. The perpendicular motion allows the diversion belt 1606 to unload an item right and/or left, thus distributing an item at a particular receiving area 1608A, 1608B, 1608C, or 1608D, according to selections by the identification device 1604. Additionally, the diversion belt 1606 may transport items received from the feed component 1602 in a forward direction toward a plurality of receiving areas 1608A, 1068B, 1608C, and 1608D, and then, while continuing the forward direction, transport items in a left-to-right, or right-to-left, direction to unload each item to receiving areas 1608A, 1608B, 1608C, and 1608D or exception area 1610. Accordingly, the units can move forward along a track while concurrently or simultaneously unloading items in a side-to-side motion. Transport and/or unloading of items in a perpendicular direction may utilize a belt corresponding to a single unit, such that each unit includes a belt for this purpose.

The system includes a plurality of receiving areas 1608A, 1608B, 1608C, and 1608D, or destinations that may be selected by the identification device 1604 for each separate or discrete transaction. As described above, the plurality of receiving areas 1608A, 1608B, 1608C, and 1608D are configured to receive items as they are unloaded by the diversion belt 1606. The receiving areas 1608A, 1608B, 1608C and 1608 or destination may include a slide, a chute, rollers, and/or an inclined surface utilizing gravitation pull, the item weight, and/or reduced surface friction to further mobilize the item and facilitate its receipt into a box, bin, bag, and/or other container. Each receiving area 1608A, 1608B, 1608C, and 1608D may be selected by the identification device 1604 to correspond to a distinct transaction and, in some embodiments, to correspond to a particular customer having several transactions. In embodiments, the plurality of receiving areas 1608A, 1608B, 1608C, and 1608D comprises at least two pairs of opposing receiving areas 1608A, 1608B, 1608C, and 1608D approximately located near the end of the diversion belt 1606 length. The plurality of receiving areas 1608A, 1608B, 1608C, and 1608D may further comprise additional pairs of opposing receiving areas 1608A, 1608B, 1608C, and 1608D for selection, therein accommodating a greater number of transactions, each transaction having a selected receiving area 1608A, 1608B, 1608C, or 1608D. In one embodiment, the plurality of receiving areas 1608A, 1608B, 1608C, and 1608D include two pairs of opposing receiving areas 1608A, 1608B, 1608C, and 1608D located near the end of the diversion belt 1606 length. In some embodiments, the plurality of receiving areas 1608A, 1608B, 1608C, and 1608D include more than one pair of opposing receiving areas. Further receiving area configurations may also be implemented.

Figure 17:
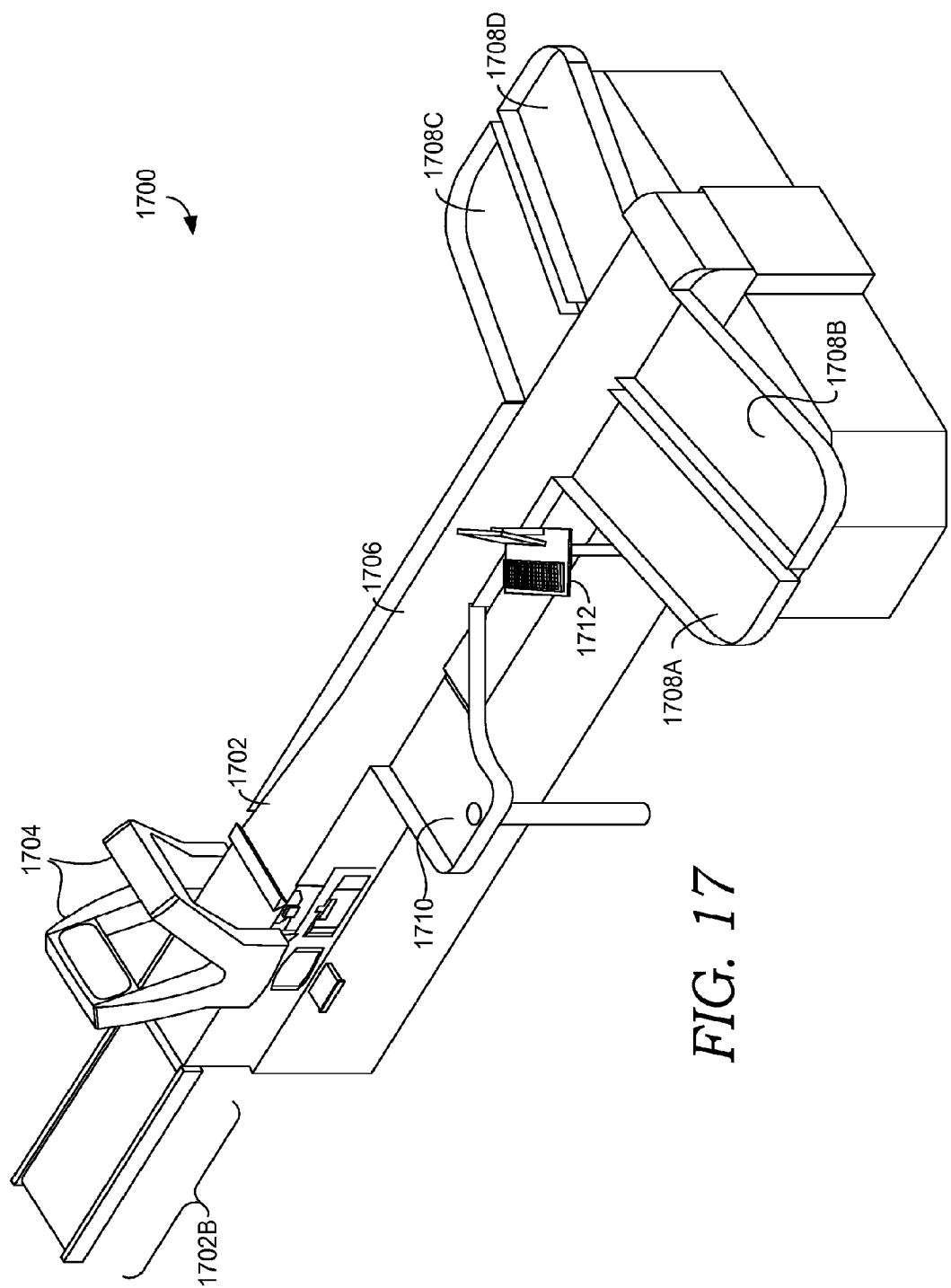
FIG. 17 depicts a back view of an exemplary system for diverting one or more items of a transaction to a designated receiving area, in accordance with embodiments of the invention.

FIG. 17 depicts a system 1700 for diverting one or more items of a transaction to a receiving area designated for said transaction, in accordance with embodiments of the invention. The system 1700 includes a feed component 1702, an identification device 1704, a diversion belt 1706, and at least one receiving area 1708A, 1708B, 1708C and 1708D, similar to the system 1600 of FIG. 16. The system 1700 of FIG. 17 further includes an exception area 1710 and user interface 1712.

In some embodiments, the identification device 1704 is configured to select an exception area 1710 for receipt of one of the one or more items upon occurrence of, for example only, a failure to identify the one item, a requirement of input prior to diverting the one item, a determination the one item is damaged, a determination the one item is expired (e.g., past a store sell-by date), an indication the one item has a security feature (e.g., an ink tag), determining the one item is subject to a recall, determining the one item is subject to a purchase limit or restriction (e.g., only a certain number of a particular item may be purchased in a single transaction, or certain items may not be purchased together), or a combination thereof. The diversion belt 1706 is further configured to transport the one item to the exception area 1710 in response to selection of the exception area 1710 by the identification device 1704. The exception area 1710 is configured to receive items that may require further processing before purchasing and/or order fulfillment may be completed. For example, when the identification device 1704 cannot initially identify the item and/or the item price, the identification device 1704 may select the exception area 1710 for receipt of the item. In one example, the identification device 1704 may identify the item and further determine the purchaser must be over the age of twenty-one years to purchase the item, in compliance with state and/or federal law. The identification device 1704, in this example, may select the exception area 1710 for receipt of the item, wherein a store staff member may verify the age of the purchaser. In another example, an RFID tag having information regarding the expiration date, a preferred shelf-life, and/or a sell-by date of a particular item is present. Said dates may be calendar dates or relative to an intake, stocking, and/or shelving date. The identification device 1704 may determine, by detecting and recognizing the RFID tag and corresponding information, that the item had met and/or exceeded one or more of a threshold date, for example. Upon said recognition, the identification device 1704 may select the exception area 1710 for receipt of the item. In response to selection of the exception area 1710, the expired item, for example, may be disposed of automatically or manually. The exception area 1710 may be selected by an identification device 1704 upon any determination or finding that an item is unfit, or not required, for purchase or sale at that time.

In yet further embodiments, the system 1700 includes a user interface 1712 configured to receive user input. A user interface may be a graphical user interface such as a display, for example. In another example, the user interface is displayed on a user's mobile device, via an application. User input may include identification of an item; verification of a purchaser's age, identity, and/or funds; confirmation of disposal of an item, confirmation of inactivation (e.g., removal and/or disablement) of a security feature from an item; or a combination thereof. In some embodiments, the user interface 1712 of the system 1700 includes voice recognition capabilities that allow a user (e.g., store staff member and/or customer) to verbally describe and/or identify an item, for example. Additionally or alternatively, a user may verbally confirm disablement of a security feature, verify a purchaser's age, and/or request assistance or help. In yet a further embodiment, the user interface 1712 may include other mechanisms and/or sensors for receiving user input (e.g., keyboard, touchscreen, movement tracking, gesture recognition, facial recognition, eye tracking, NFC, and/or RFID) from the user and/or a user device (e.g., a smartphone).

In one example, an item may have a tamper-resistant and/or safety seal. The identification device 1704 may determine or recognize that the tamper-resistant and/or safety seal of the item has been broken and/or compromised. In response, the identification device 1704 may select the exception area 1710 for receipt of the item. In response to selection of the exception area 1710, the expired item may be manually examined by a user (e.g., salesperson or purchaser). The user may further reject the sale of the item, or allow the sale based on further examination of the item. Additionally or alternatively, the item may be manually or automatically disposed of due to the broken and/or compromised tamper-resistant and/or safety seal, for example.

In another example, a security feature (e.g., ink tag, RFID label, EAS system) has been attached to and/or integrated with an item. The security feature may be detected by the identification device 1704. In response to detection and/or recognition of a security feature, the identification device 1704 may select the exception area 1710 for receipt of the item. The diversion belt 1706 may transport the item to the exception area 1710, wherein the security feature may be addressed (e.g., deactivate an electromagnetic security feature). In one example, a staff member may remove and/or disable a security feature of the item (e.g., removal of an ink tag). In another example, a staff member may verify that the purchaser (e.g., customer) meets an age requirement for purchasing an item, an item containing a particular ingredient (e.g., an aerosol, tobacco, or pseudoephedrine product), and/or a combination of items. The system 1700 may automatically disable a security feature (e.g., NFC tag) in further examples. Once a security feature has been managed or addressed, a staff member may dispatch the item to the receiving area selected for the transaction.

Upon occurrence of a failure to identify the one item, a requirement of input prior to diverting the one item, a determination the one item is damaged, a determination the one item is expired, an indication the one item has a security feature, or a combination thereof, the identification device 1704 may prompt a purchaser and/or a store staff member for input via the user interface 1712, for example. The identification device 1704 may prompt a purchaser to swipe an identification card (e.g., 2D barcode on reverse of a driver's license) to verify an age requirement that has to be satisfied for purchase of an item, or to verify the identity of a customer to satisfy an identify requirement for a payment method, without the need for the exception area 1710. Once the input is received, the identification device 1704 may select one or more of the receiving areas 1708A, 1708B, 1708C, and 1708D for receipt of the item. The diversion belt 1706 may transport the item from the exception area 1710 to the selected receiving area 1708A, 1708B, 1708C, or 1708D. In other embodiments, the identification device 1704 may prompt a user to scan, swipe, or tap a loyalty card to activate sales, specials, coupons, and/or rewards.

Figure 18:
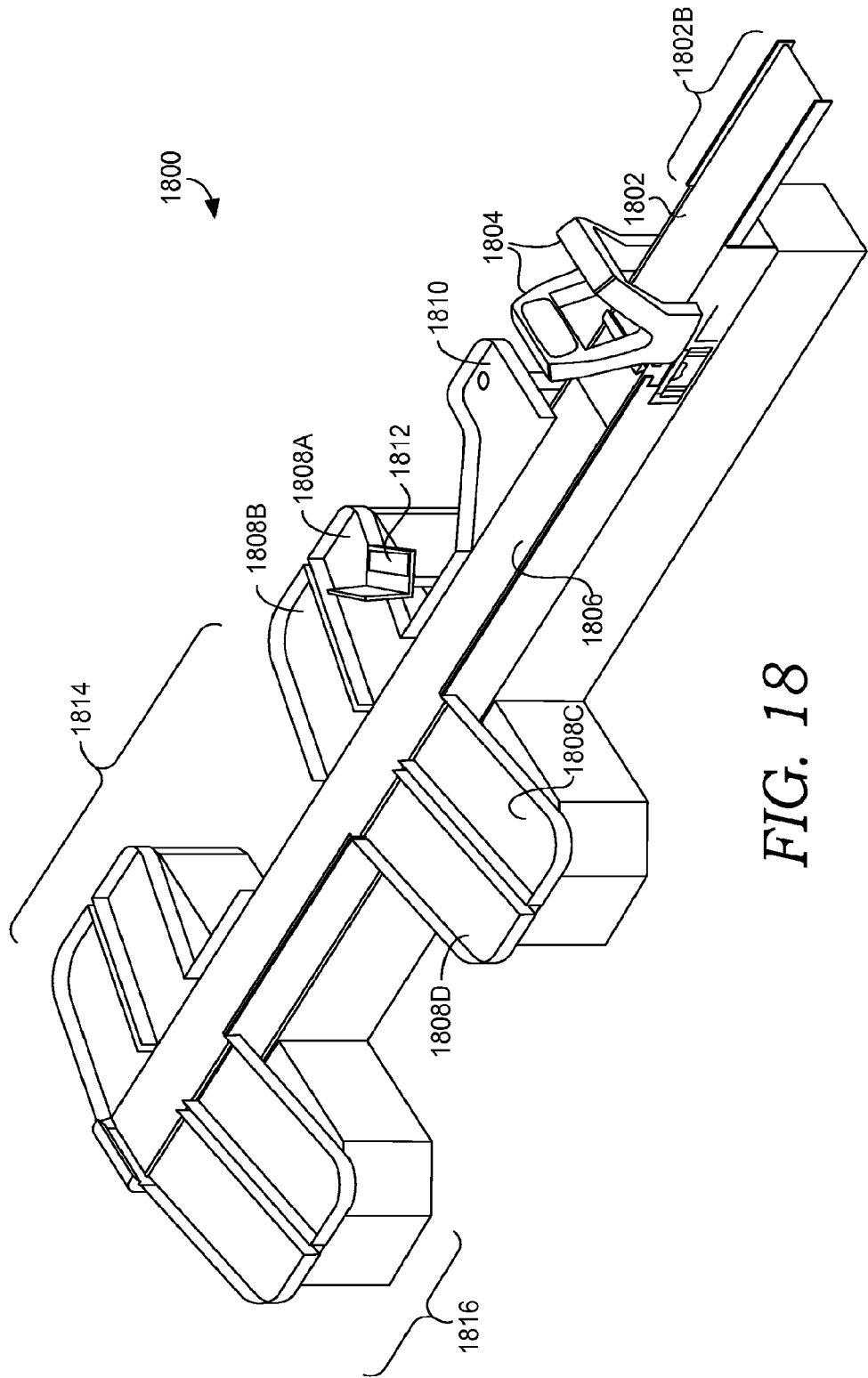
FIG. 18 depicts a front view of an exemplary system for diverting one or more items of a transaction to a designated receiving area, in accordance with embodiments of the invention.

FIG. 18 illustrates a system 1800 for diverting one or more items of a transaction to a receiving area designated for said transaction, in accordance with one embodiment of the invention. Generally, FIG. 18 illustrates a system 1800 that is modular in nature. The system 1800 includes a feed component 1802 having an item loading portion 1802B, an identification device 1804, a diversion belt 1806, a plurality of receiving areas 1808A, 1808B, 1808C, and 1808D, and a user interface 1812. In the exemplary modular system 1800 of FIG. 18, for example, the diversion belt 1806 may be extended by one or more predefined lengths, for example. One or more pre-configured receiving areas 1816 may be added to the system 1800 to receive one or more items from the diversion belt 1806. Additional receiving areas are further available for selection by the identification device 1804 for transactions. Additional receiving areas 1816 may be configured with extension lengths from the diversion belt 1806. Accordingly, any number of lengths 1814 may be added to the diversion belt 1806 and any number of additional receiving areas 1816 may be added, as well. The greater number of receiving areas allows the system 1800 to manage a greater number of separate transactions, as each transaction may be quickly dispatched to selected receiving areas, while avoiding congestion (e.g., "jams") of items on the diversion belt 1806.

Figure 19A:
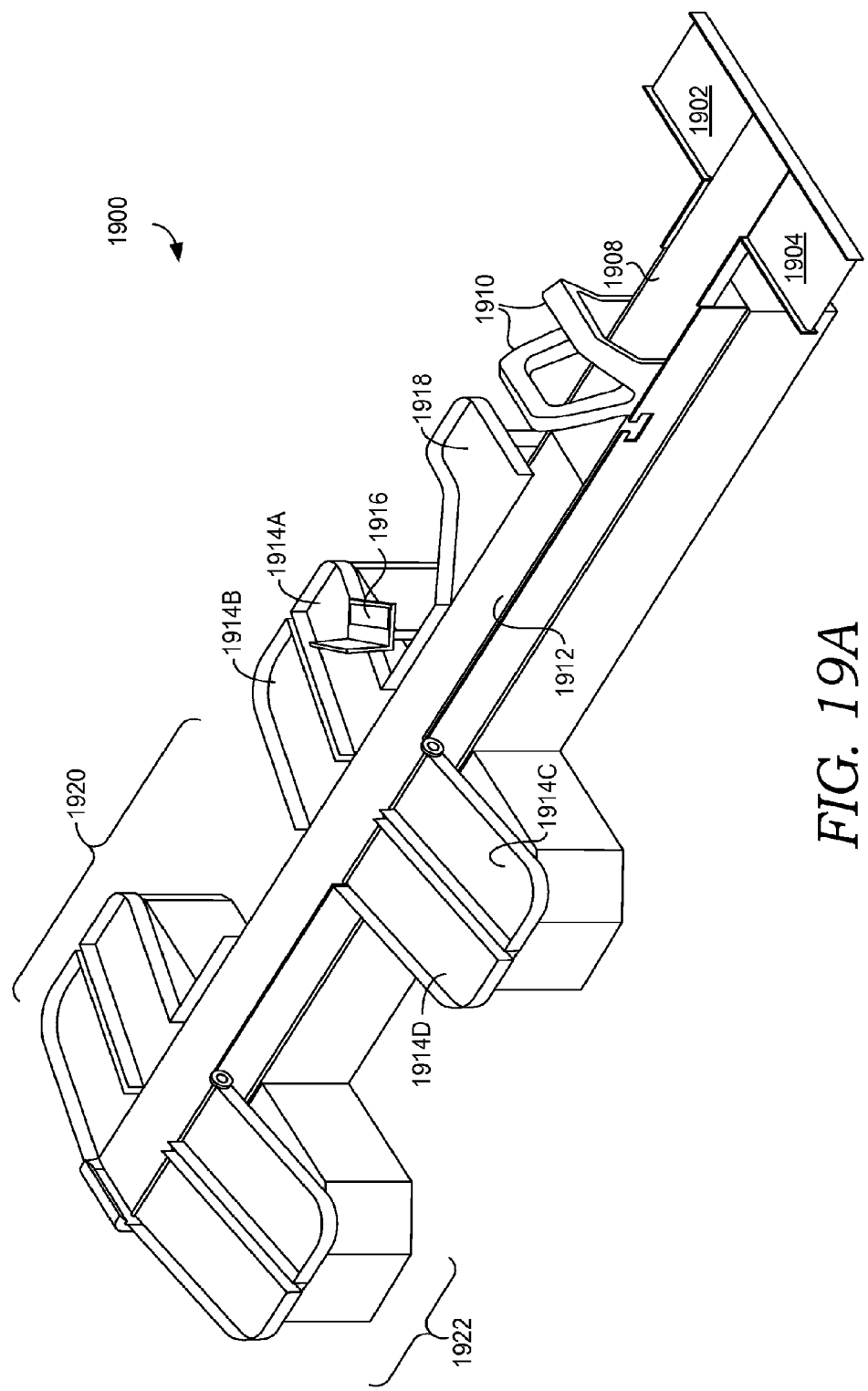
FIGS. 19A and 19B depict a plan view of an exemplary check-out apparatus for automated sorting of goods corresponding to a purchase transaction, in accordance with embodiments of the invention.

Turning to FIG. 19A, it depicts a check-out apparatus 1900 for automated sorting of goods corresponding to a purchases transaction, in accordance with embodiments of the present invention. The apparatus includes a first belt 1902, a second belt 1904, a merge belt 1908, an identification device 1910 a third belt 1912, and at least one receiving bay 1914A, 1914B, 1914C, and 1914D. In further embodiments, the apparatus 1900 includes an exception area 1918 for goods subject to further processing. In some embodiments, the apparatus includes modular aspects for incorporating additional length(s) 1920 of the third belt 1912 and/or additional receiving bays 1922.

The first belt 1902 and second belt 1904 each receive goods comprising a transaction, requisition, and/or order. The first and second belts 1902 and 1904 are configured to transport said goods to the merge belt 1908. The belts 1902 and 1904 may be activated alternatively, and/or using a sequence, such that the goods on the merge belt 1908 may belonging to separate transactions. Generally, a first customer or operator may approach the first belt 1902 and begin to place items and/or goods for purchase on the first belt 1902. Concurrently, a second customer or operator may approach the second belt 1904 and also begin to place goods for purchase on the second belt 1904. Any number of belts may be present in order to receive goods for transactions, shipping orders, etc. In further embodiments, the first and/or second belts 1902 and 1904 may be longer in length and/or width, and incorporate separators and/or barriers, so as to provide a larger belt area for the loading of goods belonging to corresponding transactions.

Additionally, one or more sensors may be included in the apparatus 1900 for monitoring the placement of items on the first and second belts 1902 and 1904. Generally, the one or more sensors may identify whether goods are present on the first and/or second belts 1902 and 1904. Further, the one or more sensors may identify where goods are placed on the belt, as the placement of a good on either the first or second belt 1902 and 1904 may indicate the need to activate the corresponding belt having the good. For example, the one or more sensors may identify that the first belt 1902 has at least one good present, wherein the good is in close proximity to the merge belt 1908. The one or more sensory may identify that the second belt 1904 has at least one good present, for example, wherein the good is not as close to the merge belt 1908 as the good present on the first belt 1904. The one or more sensors may use this information to select which of the first and second belts 1902 and 1904 to activate, or to select a sequence for activation alternating between the first and second belts 1902 and 1904. Alternatively, the one or more sensors may communicate information regarding goods on either belt to the identification device 1910.

In further embodiments, the one or more sensors may generally measure the number of goods received on the first belt 1902 and the number of goods received on the second belt 1904, wherein the apparatus 1900 selects to engage the belt having the fewest number of goods in order to optimize throughput. As described above, the one or more sensors may detect the presence of goods on a belt as well as a distance from a good on either the first or second belt 1902 and 1904 to the merge belt 1908. For example, a first sensor detects that the first customer or operator is placing goods on the first belt 1902 and the second sensor detects that the second customer or operator is concurrently placing goods on the second belt 1904 (e.g., detects that goods are present on each belt and begins activation of each belt). The apparatus 1900 may determine which of the first or the second customers or operators are loading the respective belt with goods fastest. Then, the apparatus 1900 may determine to engage the belt (e.g., operate the belt so that goods flow to the merge belt 1908) corresponding to the customer or operator who is the fastest at placing goods on their respective belt (e.g., detects distance of goods on each belt from the merge belt 1908). Additionally or alternatively, the apparatus 1900 may determine, using the one or more sensors, which of the first or second customer or operators has finished placing goods comprising a complete transaction on their respective belt. The apparatus 1900 may determine to operate the belt corresponding to the customer or operator who has finished loading goods, for example. Alternatively and/or additionally, the determination that the first or second customer has finished placing goods comprising a complete transaction on their respective belt may be triggered manually by a person such as a customer, operator, staff member, cashier, etc.

The apparatus 1900 includes a merge belt 1908 for receiving goods from the first belt 1902 and for receiving goods from the second belt 1904. The merge belt 1908 is configured to transport goods through an identification zone, proximate to an identification device 1910. In some embodiments, the identification zone is a "tunnel" area created by the identification device 1910 (e.g., Jade X7 scanner) wherein goods pass through the tunnel area such that the goods may be identified by the identification device 1910.

The identification device 1910 is configured to identify goods when said goods are transported through the identification zone by the merge belt 1908. The identification device 1910 is also configured to select at least one receiving bay 1914A, 1914B, 1914C, or 1914D to receive the goods (e.g., designate a first receiving bay to receive goods comprising the transaction of the first customer or operator). The identification device 1910 may, in some examples, select an exception area 1918 for receipt of goods based on an inability to identify a particular good, detection of damage to the particular good, determining the particular good has met and/or exceeded an expiration date, determining that verification is required for the purchase of the particular good, determining the particular good is subject to a recall, determining the particular good is subject to a purchase limitation or restriction, or a combination thereof. The particular good may require further processing, identification by a user at the exception area 1918, and/or user input via the user interface 1916, for example. Once a receiving bay 1914A, 1914B, 1914C, and 1914D and/or exception area 1918 has been selected, the goods may be transported from the identification device 1910 to a third belt 1912 for dispatch to the receiving bay 1914A, 1914B, 1914C, and 1914D and/or an exception area 1918.

In further embodiments, the identification device may 1910 may receive items from each of the first and second belts 1902 and 1904 as passed to the merge belt 1908. The identification device 1910 may utilize a sequence of alternating activation, and thus loading of goods from, each of the first and second belts 1902 and 1904. As such, the identification device 1910 may sort the goods to the appropriate receiving bay 1914A, 1914B, 1914C, and 1914D and/or exception area 1918. Alternatively and/or additionally, the identification device 1910 may utilize information from sensors to control the follow of goods onto the merge belt 1908 from the first and second belts 1902 and 1904. Accordingly, the identification device 1910 may identify and sort goods from more than one transaction at a time, such that "mixed" goods on the merge belt 1908 are correctly diverted to the appropriate receiving bay 1914A, 1914B, 1914C, and 1914D via the third belt.

The third belt 1912 is generally for receiving the goods from the merge belt 1908 and for diverting goods to the at least one selected receiving bay 1914A, 1914B, 1914C, and 1914D and/or exception area 1918. In embodiments, the third belt 1912 is a cross belt capable of facilitating transport in more than three different directions, as previously described herein. As such, the third belt 1912 operates to sort goods to appropriate receiving bays 1914A, 1914B, 1914C, and 1914D and/or an exception area 1918, based on information from the identification device 1910, for example.

The apparatus 1900 includes one or more receiving bays 1914A, 1914B, 1914C, and 1914D for selection by the identification device 1910 and for receiving the goods from the third belt 1912. The exemplary configuration depicted in FIG. 19A illustrates a first group of receiving bays 1914A, 1914B, 1914C, and 1914D separated from a second group of receiving bays 1922. Any number of receiving bays may be present in order to handle large numbers of transactions, shipping orders, etc. Accordingly, the number of belts for receiving goods and the number of receiving bays together creates potential for faster throughput of goods while reducing the occurrence of slowed processing or "jams" of goods on the various belts of the apparatus 1900.

Figure 19B:
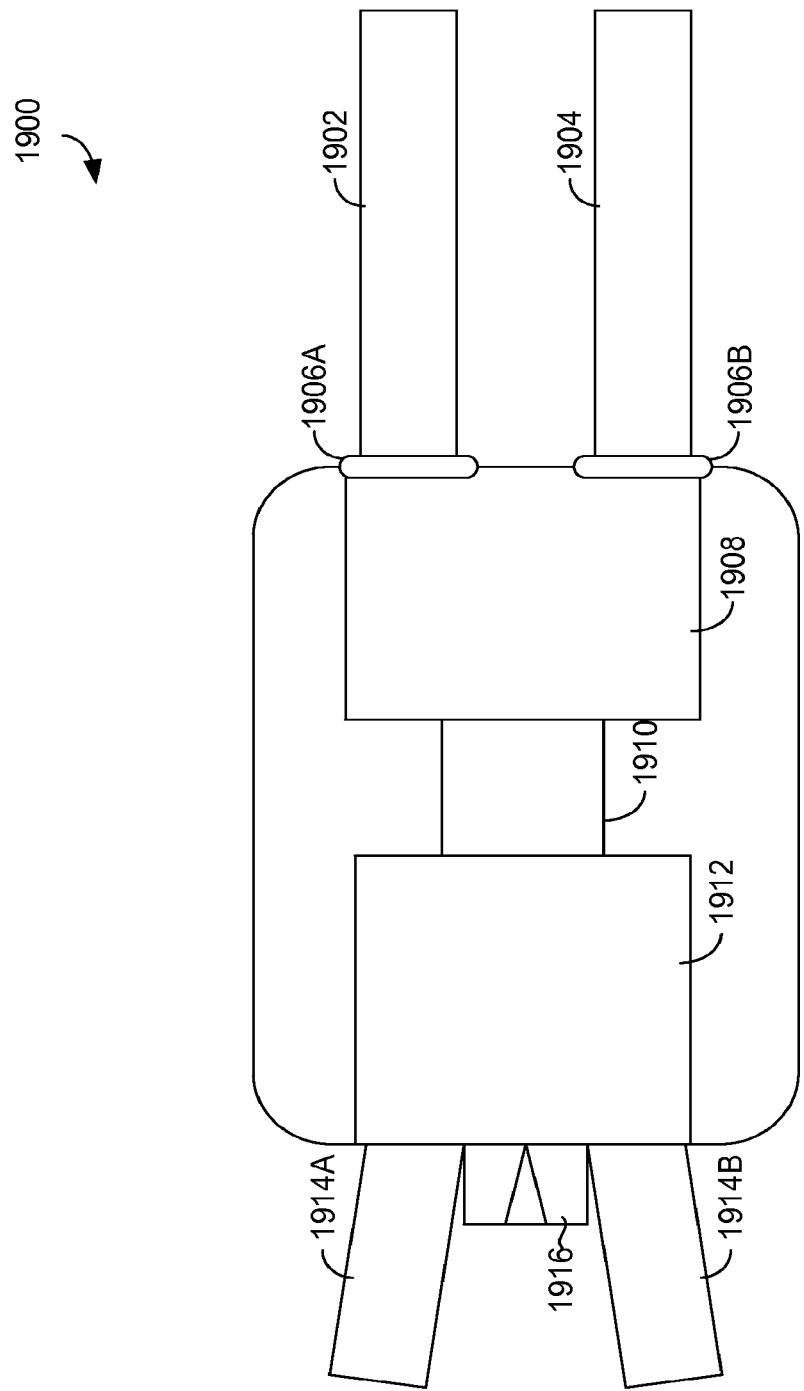

FIG. 19B depicts a check-out apparatus 1900 for automated sorting of goods corresponding to a purchase transaction, in accordance with embodiments of the invention. The apparatus 1900 includes a first belt 1902, a first barrier 1906A, a second belt 1904, a second barrier 1906B, one or more sensors (not shown), a merge belt 1908, an identification device 1910, a third belt 1912, and at least one receiving bay 1914A and 1914B. In embodiments, the apparatus 1900 also includes a user interface 1916.

The first belt 1902 receives goods and includes a first barrier 1906A for separating the first belt 1902 from the merge belt 1908. The first barrier 1906A is configured to control the flow of goods from the first belt 1902 to the merge belt 1908. The second belt 1904 receives goods and includes a second barrier 1906B for separating the second belt 1904 from the merge belt 1908. The second barrier 1906B is configured to control the flow of goods from the second belt 1904 to the merge belt 1908. The first barrier 1906A and the second barrier 1906B may comprise any number of gates, arms, or other mechanisms for physically blocking goods from transport to the merge belt 1908. For example, the first and second barriers 1906A and 1906B may be physical barriers, in some embodiments. In other embodiments, the first and second barriers 1906A and 1906B are sensors which act as a nontangible barrier governing the transport to the merge belt 1908. In yet further embodiments, the first and second barriers 1906A and 1906B comprise a combination of a physical barriers and at least one sensors, which work in tandem and/or are integrated together.

Generally, a first customer or operator may approach the first belt 1902 and begin to place items and/or goods for purchase on the first belt 1902. Concurrently, a second customer or operator may approach the second belt 1904 and also begin to place goods for purchase on the second belt 1904. Alternatively, the first and second persons may be staff or operators at a sorting facility for fulfillment of requisitions and/or orders, in another example. The first and second barriers 1906A and 1906B are, for example, set in a closed position, in some embodiments, wherein the closed position prevents the flow of items from either the first or second belts 1902 and 1904, respectively, to the merge belt 1908. In some embodiments, a closed position is the default setting for the first and second barriers 1906A and 1906B. When a barrier is set to an open position, a corresponding belt will allow the flow of goods to travel from the corresponding belt to the merge belt 1908. Alternatively, a barrier may be removed and replaced in order to allow and halt, respectively, the flow of goods to the merge belt 1908 from a belt 1902 or 1904 corresponding to the barrier. The first and second barriers 1906A and 1906B may be manipulated manually and/or automatically to control the follow of goods to the merge belt 1908. In some embodiments, the open and closed positions of the first and second barriers 1906A and 1906B may be monitored by one or more sensors.

The apparatus 1900 includes one or more sensors configured to detect and/or measure goods received by one or more of the first belt 1902 and the second belt 1904. In embodiments, a first sensor observes the first belt 1902 while a second sensor observes the second belt 1904. The one or more sensors may include a motion sensor, a weight scale, and/or a camera, for example. In some embodiments, the one or more sensors measure the number of goods received on the first belt 1902 and the number of goods received on the second belt 1904, wherein the apparatus 1900 selects to manipulate the barrier that corresponds to the feed belt having the fewest number of goods in order to allow the flow of goods to the merge belt 1908. For example, a first sensor detects that the first customer is placing goods on the first belt 1902 and the second sensor detects that the second customer is concurrently placing goods on the second belt 1904. The apparatus 1900 may determine which of the first customer or the second customer is loading the respective belt with goods fastest. As previously described, sensors may activate a belt when a good is determined to be present and further, distance of a good from the merge belt 1908 may be utilized to determine load speed. Then, the apparatus 1900 may determine to manipulate the barrier corresponding to the customer who is the fastest at placing goods on their respective belt, thus allowing the flow of goods to the merge belt 1908. Additionally or alternatively, the apparatus 1900 may determine, using the one or more sensors, which of the first customer or the second customer has finished placing goods comprising a complete transaction on their respective belt. The apparatus 1900 may determine to manipulate a barrier corresponding to the "finished" belt, for example. In yet a further embodiment, using the one or more sensors, the apparatus 1900 may determine whether the first belt 1902 or the second belt 1904 has fewer goods comprising a transaction. Based on the information obtained via the one or more sensors, one of the first or second barriers 1906A and 1906B may be manipulated (e.g., removed and/or set to an open position) to allow the flow of goods from the corresponding belt to the merge belt 1908. Accordingly, the corresponding belt may be activated to transport goods to the merge belt 1908 when a respective barrier is removed and/or set to an open position. In this way, only one of the first belt 1902 or second belt 1904 may "feed" goods to the merge belt 1908 such that the first customer's goods and transaction is kept apart and distinct from the second customer's goods and transaction. In some embodiments, the flow of goods to the merge belt 1908 is alternated between the first and second belts 1902 and 1904 such that only one of the first or second barriers 1906A and 1906B allows goods to pass to the merge belt 1908. In further embodiments, when the one or more sensors determine that no goods remain on a feed belt corresponding to a barrier that is set to an open position, the apparatus 1900 may determine to manipulate said barrier in order to stop or interrupt the flow of goods to the merge belt 1908. Accordingly, the one or more sensors may detect the "end" of a customer's transaction wherein all goods comprising a complete transaction have been received by the merge belt 1908. In other embodiments, the number of goods comprising a transaction, the speed of loading goods onto a belt relative to another belt, and/or other factors (e.g., customer indicates a particular payment type, sensor detects a good that requires manual verification of the customer's age) that can affect speed and efficiency of purchases made using a check-out apparatus 1900 may be used to determine which of the first or second barrier 1906A or 1906B may be manipulated to allow or halt the flow of goods from a corresponding belt.

In one embodiment, the one or more sensors observe and/or measure, continually or intermittently, the placement of goods on the first and second belts 1902 and 1904. Accordingly, the one or more sensors may measure the speed of goods received on the first belt 1902 and a speed of goods received on the second belt 1904. Then, the apparatus 1900 may compare the speed of goods received on the first belt 1902 to the speed of goods received on the second belt 1904 and select to manipulate the barrier corresponding to the faster of the first belt 1902 or second belt 1904 to allow a more efficient flow of goods to the merge belt 1908.

The apparatus 1900 includes a merge belt 1908 for receiving goods from the first belt 1902 when the first barrier 1906A is set to an open position and for receiving goods from the second belt 1904 when the second barrier 1906B is set to an open position. The merge belt 1908 is further configured to transport goods through an identification zone. The identification zone is proximate to an identification device 1910. In some embodiments, the identification zone is a tunnel area created by the identification device 1910, wherein goods pass through the tunnel area where they may be identified by the identification device 1910.

The identification device 1910 is configured to identify goods when said goods are transported through the identification zone by the merge belt 1908. The identification device 1910 is also configured to select a receiving bay 1914A or 1914B to receive the goods (e.g., designate a first receiving bay to receive goods comprising the transaction of the first customer). The identification device 1910 may select an exception area for receipt of goods based on an inability to identify a particular good, detection of damage to the particular good, determining the particular good has met and/or exceeded an expiration date, determining that verification is required for the purchase of the particular good, determining the particular good is subject to a recall, determining the particular good is subject to a purchase limitation or restriction, or a combination thereof. The particular good may require further processing, identification by a user at the exception area, and/or user input via the user interface 1916, for example. Once a receiving bay 1914A or 1914B or an exception area has been selected, the goods may be transported from the identification device 1910 to a third belt 1912 for dispatch to the receiving bay 1914A or 1914B or the exception area.

The third belt 1912 is generally for receiving the goods from the merge belt 1908 and for diverting goods to the selected receiving bay 1914A or 1914B and/or the exception area. In embodiments, the third belt 1912 is a cross-belt capable of facilitating transport in more than three different directions, as previously described herein.

The apparatus 1900 includes one or more receiving bays 1914A and 1914B for selection by the identification device 1910 and for receiving the goods from the third belt 1912. The exemplary configuration depicted in FIG. 19B illustrates a first receiving bay 1914A separated from a second receiving bay 1914B by a staff member area having a user interface 1916, as previously described herein. The staff member area with the user interface 1916 is located such that a staff member can easily view the loading of goods on the first and second belts 1902 and 1904 by purchasers, the receipt of goods by the merge belt 1908, the transport of goods to the identification device 1910, the transfer of goods to the third belt 1912, and finally, sorting and transport of goods to a selected receiving bay 1914A and 1914B. Accordingly, a staff member can oversee the check-out operation. Further, any goods that require further processing may be dispatched and/or diverted to the staff member area for said processing. Additionally, the staff member may assist with bagging and/or packing goods at each receiving bay 1914A and 1914B, as the staff member areas is conveniently located between receiving bays 1914A and 1914B. Any number of receiving bays may be present in order to handle large numbers of transactions. In a further embodiment, the apparatus 1900 may include three receiving bays. Additionally, in such an embodiment, the apparatus 1900 may include two staff member areas, each having a user interface, for example. Similarly, in various embodiments, the apparatus 1900 may include any number of belts for receiving goods from customers in order to facilitate the handling of larger numbers of transactions. For example, the apparatus 1900 may include a fourth belt for receiving goods and having a corresponding barrier for separating the fourth belt from the merge belt 1908, wherein the corresponding barrier is configured to control the flow of received goods from the fourth belt to the merge belt 1908.

Figure 20:
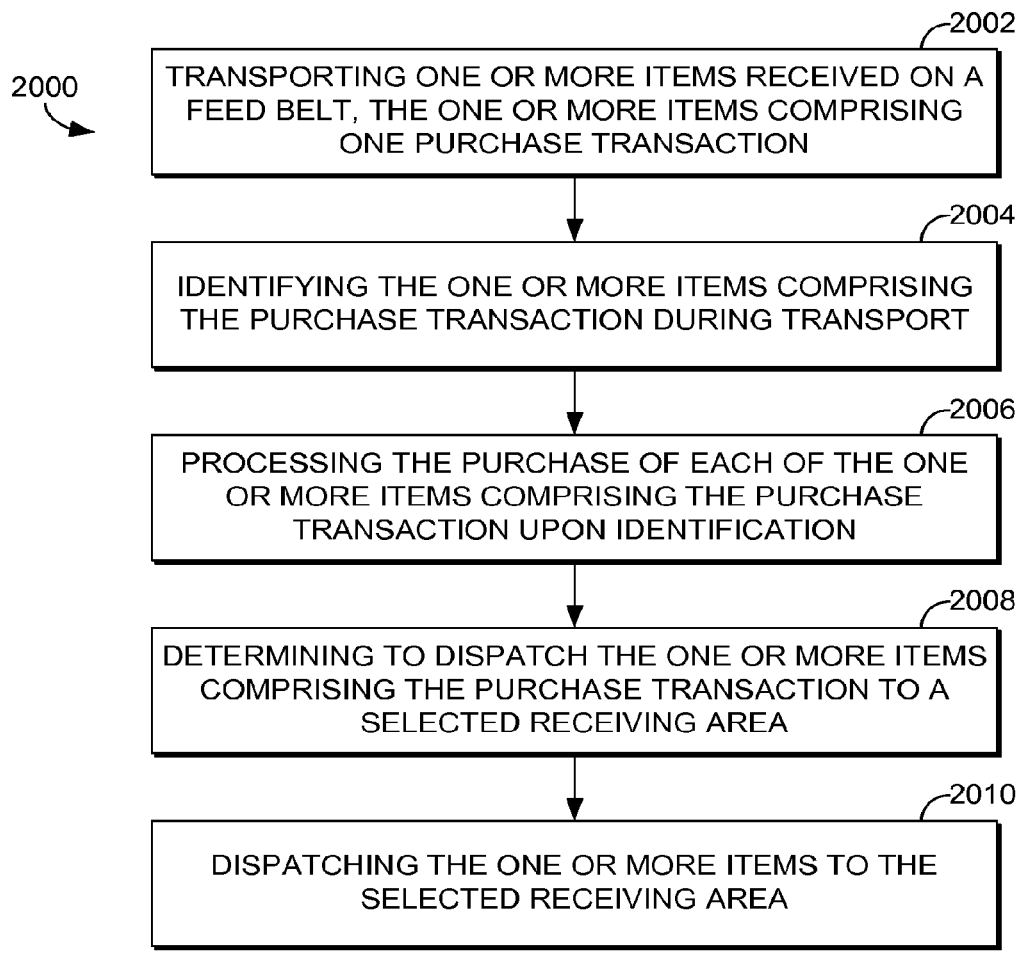
FIG. 20 depicts a logic diagram representing an exemplary method for diverting items in a transaction to a receiving area, in accordance with embodiments of the invention.
Figure 21:
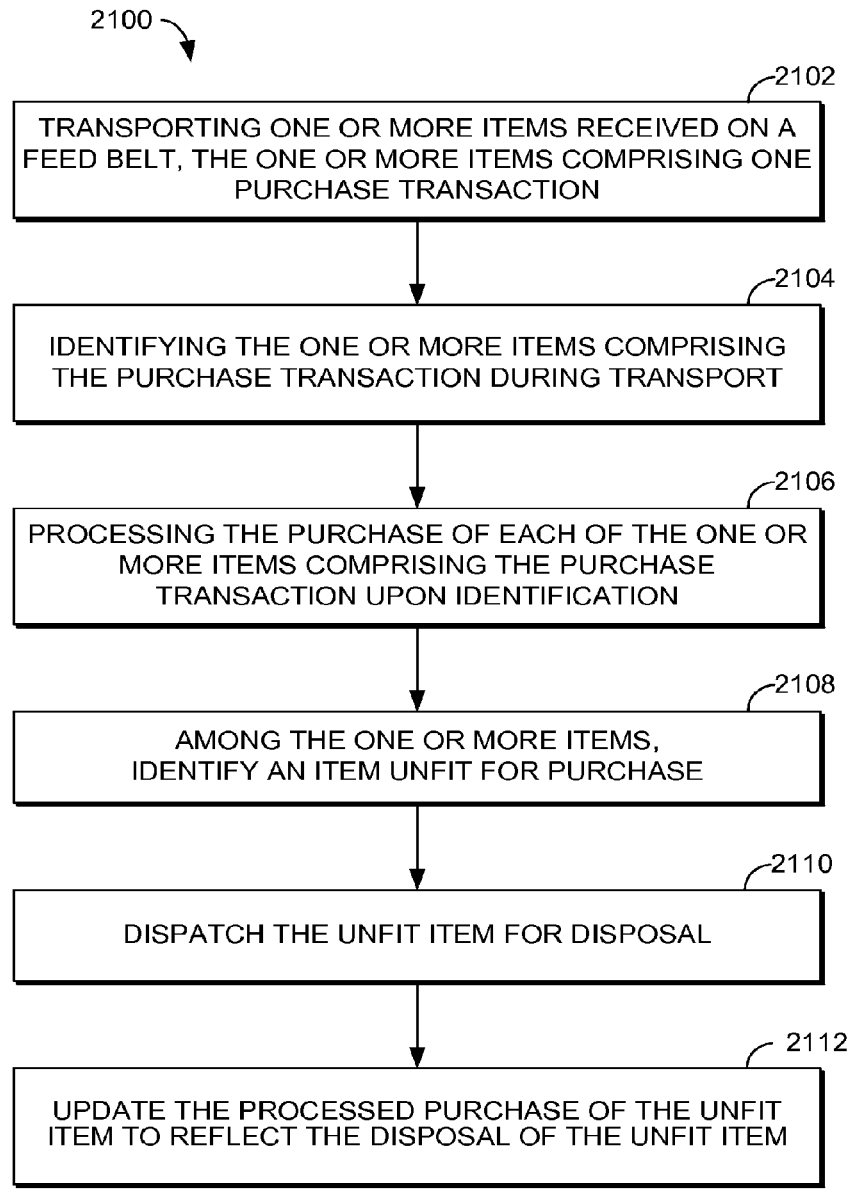
FIG. 21 depicts a logic diagram representing an exemplary method for diverting items in a transaction to a receiving area, in accordance with embodiments of the invention.

Turning now to FIGS. 20 and 21, an exemplary method of diverting items in a transaction is illustrated, in accordance with one embodiment of the invention. The order in which the methods 2000 and 2100 are described is not intended to be construed as a limitation, and any number of the described method blocks can be combined in any order to implement the methods, or alternate methods. The blocks should not be interpreted as having any sequential requirement or dependency related to any component(s) and/or parts(s). Additionally, individual operations may be omitted from the methods 2000 and 2100 without departing from the spirit and scope of the subject matter described herein.

At FIG. 20, a method 2000 for diverting items comprising a transaction to a single receiving area is shown. At block 2002, the method 2000 includes transporting one or more items comprising one purchase transaction. The one or more items may be transported in response to their detection, their placement onto a feed belt, in response to user input, and/or automatically. The method includes identifying the one or more items comprising the purchase transaction during transport, shown at block 2004. In embodiments, the items are automatically identified as they are transported by an identification device and/or pass through an identification zone. For example, the items may be identified as they are transported from a feed component to a diversion belt. In some embodiments, the transport of the item is not interrupted by the identification of the item, such that the flow of items to an identification device remains continuous and/or steady. In further embodiments, items that require further processing are determined to be dispatched to an exception area, which further prevents interruption of the flow of items on the feed component.

Upon identification, at block 2006, the purchase of the items comprising the purchase transaction is processed. In some embodiments, each item is processed for purchase individually, as each item is identified. In other embodiments, all items comprising the transaction are processed for purchase together, once each item has been identified. In various embodiments, one or more items selected for dispatch to an exception area may be processed before, during, or after any other items comprising the transaction are processed for purchase.

At block 2008, the method includes determining to dispatch the one or more items comprising the purchase transaction to a selected receiving area. A receiving area may be selected to receive each and every item comprising a transaction, or more than one receiving area may be selected to receive portions of the particular transaction. For example, a first receiving area may be selected to receive all refrigerated goods in a transaction and a second receiving area may be selected to receive all non-refrigerated goods in the same transaction, wherein the first and second receiving areas may be adjacent to one another. In another example, more than one receiving area may be selected to receive all the items comprising a transaction, for example, when a transaction comprises a large number of items.

And, at block 2010, the method includes dispatching the one or more items to the selected receiving area. Accordingly, each of the items is dispatched to a receiving area (and/or an exception area) as selected, for example, by the identification device. Each of the items may be received in a receiving area, wherein a staff member and/or a purchaser may bag the items for carrying or shipping, for example.

Now, at FIG. 21, an exemplary method 2100 for diverting items in a transaction is shown, in accordance with an embodiment of the invention. The method 2100 transports one or more items comprising a purchase transaction, a requisition, a wave, or an order, the items received on a feed belt, at block 2102. The transport of the items may be automatic, in response to user input, and/or in response to detection of a customer, shopping cart, shopping basket, and/or items. At block 2104, the method 2100 identifies the one or more items comprising the purchase transaction during transport, for example, via a feed belt. The purchase of each of the one or more items comprising the purchase transaction may be processed upon identification and/or sortation of said items (at block 2106). Generally, the one or more items are automatically identified during transport as the items pass near an identification device and/or through an identification zone. But, based on an inability to identify a particular item, detection of damage to the particular item, determining the particular item has met an expiration date, determining that verification is required for the purchase of the particular item, determining the particular item is unfit for sale, determining the item is not required, or a combination thereof, the method determines to dispatch one of the one or more items to an exception area separate from the selected receiving area. There may be an indication that the particular item should be further processed or that further processing is required (e.g., identification at the exception area), for example, because the method identifies, among the one or more items, an item that may be unfit for sale (e.g., expired and/or damaged), shown at block 2108. In some embodiments, an item may not be required for an order and thus further processing is indicated. In other embodiments, the item may not be readable by an identification device, for example, and further processing may be indicated. The item requiring further processing may be dispatched for disposal, for example, at block 2110. The method 2100 may then, at block 2112, update the processed purchase of the unfit or unrequired item to reflect the disposal of the unfit or unrequired item. When the purchase of the unfit or unrequired item has not yet been processed, no update may be required or necessary.

In one example, the method 2100 includes receiving a purchase transaction request comprising at least one item. The purchase transaction request may correspond to a customer shopping list (e.g., submitted electronically from an online store front or submitted wirelessly from a mobile device or wireless application). Once the purchase transaction request is received, the shopping list may be processed for fulfillment. The at least one item comprising the purchase transaction request may be located and transferred for automated check-out and sorting. In one embodiment, an electronic list and/or a printable list may be used by a person to manually locate items for purchase. In other embodiments, an electronic list will be utilized by a computing device to locate and load items for purchases in an automated system that manages an item inventory. In such an example, the method 2100 may include receiving, for fulfillment of the purchase transaction request, one or more items that are the same or similar to the at least one item of the purchase request. In some embodiments, for example, an item on the shopping list corresponding to the purchase transaction request may be out of stock or otherwise unavailable. Accordingly, a similar item may be substituted for the unavailable item. In further embodiments, a free sample or promotional item may be received for inclusion with the fulfillment of items for the purchase transaction request, based on the one or more items called for by the purchase transaction request. Upon receipt of the one or more items, the method 2100 continues by transporting the received items on a feed belt and identifying the received items. The identification of each item may be used to confirm that an item on the purchase transaction request and/or shopping list is being fulfilled, or to confirm that an item is unavailable at that time for fulfillment. Further, the method may process the purchase of each fulfillment item and select an area for receipt of said items. Additionally, items that are unfit for sale or unrequired may be dispatched for disposal. In further embodiments, a fit item may be retrieved, manually or automatically, from an inventory in order to replace the unfit or unrequired item in the purchase transaction. Fulfillment items may then be dispatched to a receiving area wherein the items may be packed and/or shipped to a purchaser or other recipient (e.g., item is a gift). Throughout this process, a person may aid the system by loading the feed belt and/or collecting the items in a received area for shipping.

In further embodiments, more than one shopping list may be received and utilized to for fulfillment of an item and/or completion of a shopping list. For example, the items corresponding to multiple, separate, shopping lists may be randomly loaded onto the feed belt. In other words, the feed belt may be loaded in a random fashion, having items comprising many separate lists. The identification device, having access to all of the shopping lists (e.g., electronic list, wishlist), may identify the items on the belt and divert them to appropriate receiving areas. For example, the identification device identified an umbrella and identifies the particular shopping list including said umbrella. The identification device will then communicate with the system, and belts, for example, to ensure that the umbrella is correctly sorted and diverted to a receiving bay specific to the identified particular shopping list including the umbrella.

In summary, the cross-belt system having a plurality of interlocking palettes is provided. The palettes are configured to discharge items to appropriate offloading areas in response to a controller. The palettes are each configured with a belt that is driven by gears that receive driving power from the lift of the passive rollers below the palettes. Lower idler rollers in the palettes provide the transmission of motion from the series rollers below the palettes. In some embodiments these palettes are affixed to a carrier chain. The divert mechanism is comprised of a series of pop-up rollers arranged under the palettes and parallel to the direction of item flow. The series of pop-up rollers under each palette may be sequenced (by a controller) to lift into contact with the idler roller. The angle of contact with the idler roller determines the discharge direction for the palette's belt. In certain embodiments, the direction of movement is nearly perpendicular to the direction of item flow.

As explained above, the palettes form the conveyor belt of the cross-belt system. The palettes are assembled to form an endless loop that wraps around the track in the cross-belt system. The interlocking pattern of each palette offers a single and continuous horizontal and flat surface. This configuration reduces the risk of having customers injured by being clamped between moving conveyor gaps. Also, the flat interconnected surface prevents items from falling in the space below the conveyor belt through gaps in the conveyor surface. Finger guards are installed in the cross-belt system to prevent access to the conveyor in the end zones where the palettes are inverted.

During a descent or incline around the track of the cross-belt system, the palettes are configured to detach from each other. Once horizontal, a continuous flat surface of the conveyor belt is reconstructed by interlocking each of the palettes (this occurs at the top and bottom of the cross-belt system). In certain embodiments, the palettes are moved synchronously by a carrier chain that engages every single module as it moves along the track of the cross-belt system.

As the conveyor belt moves, one or more items on the belt are sorted. The items placed on the conveyor belt may be close together with as little as one palette for separation. The cross-belt system may have a controller that sequences the series of rollers below the palettes into and out of contact with individual palettes. When the items pass over the diverter component the items are discharged to different off-loading locations even though they are closely spaced on the conveyor belt. The cross-belt system activates a different number of diverting components according to object size, thus reducing the minimum size of the object that can be diverted to the width of one module.

A system, apparatus, and methods for identifying and diverting items for purchase to designated receiving areas are described above. The system employs cross-belt features for diverting items in a transaction to a receiving area selected for a particular transaction. The system may identify items requiring additional processing and dispatch said items to an exception area for said processing. As such, the system provides fast and efficient automated customer transactions in a physical retail store as well as automated fulfillment of electronic purchases or orders. The system prevents transactional cross-contamination by ensuring items from different transactions are kept separate while maintaining high-confidence item recognition and a high throughput of transactions.

Many different arrangements of the various components depicted, as well as components not shown, are possible without departing from the scope of the claims below. Embodiments of this technology have been described with the intent to be illustrative rather than restrictive. Alternative embodiments will become apparent to readers of this patent after and because of reading it. Alternative means of implementing the aforementioned can be completed without departing from the scope of the claims below. Certain features and subcombinations are of utility and may be employed without reference to other features and subcombinations are contemplated within the scope of the claims.

The technology claimed is:

1. A system for diverting one or more items of a transaction to a receiving area designated for said transaction, the system comprising:
   a feed component;
   an identification device;
   a diversion belt;
   one or more diverter components situated below the diversion belt; and
   a plurality of receiving areas,
   wherein the feed component is configured to transport the one or more items to the identification device and to the diversion belt,
   wherein the identification device is configured to identify each of the one or more items comprising the transaction and to designate one of the plurality of receiving areas for the transaction, each of the plurality of receiving areas being capable of being designated by the identification device for separate transactions when available, the designated receiving area being available,
   wherein the diversion belt is configured to transport at least a portion of the one or more items to the designated receiving area,
   wherein at least one of the feed component and the diversion belt are comprised of a plurality of interlocking palettes, each of the plurality of interlocking palettes including a palette belt,
   wherein adjacent palettes are detachably meshed via self-aligning peaks and troughs imprinted on facing sides of the adjacent palettes, and wherein the diverter components include a series of rollers that lift to engage one or more palette belts and divert at least a portion of the one or more items to the plurality of receiving areas and a controller to trigger one or more rollers in the series of rollers to engage the one or more palette belts.

2. The system of claim 1, wherein the system is modular such that the diversion belt may be extended by one or more predefined lengths, and one or more preconfigured receiving areas may be added to the one or more predefined lengths of the diversion belt.

3. The system of claim 1, wherein the identification device identifies each of the one or more items using a barcode, dimensions, label(s), logo(s), weight, color, packaging, shape, size, or a combination thereof.

4. The system of claim 1, wherein the identification device further is configured to select an exception area for receipt of one of the one or more items upon occurrence of a failure to identify the one item, a requirement of input prior to diverting the one item to a receiving area, a determination the one item is unfit for sale, an indication the one item has a security feature, or a combination thereof.

5. The system of claim 1, wherein the diversion belt is further configured to transport the one item to the exception area in response to selection of the exception area by the identification device.

6. The system of claim 1, further comprising a user interface configured to receive user input comprising verification of a purchaser's age, verification of a purchaser's identity, identification of the one item, confirmation of disposal of the one item, confirmation of inactivation of a security feature, or a combination thereof.

7. The system of claim 1, wherein the plurality of receiving areas includes a configuration of more than three receiving areas located near a terminus of the diversion belt.

8. The system of claim 1, wherein the identification device designates the at least one of the plurality of receiving areas based on a number of items comprising the transaction.

9. The method of claim 1, wherein the identification device is further configured to designate more than one of the plurality of receiving areas, wherein the more than one receiving areas are adjacent to each other, and wherein the selection is based on a total number of the one or more items comprising the transaction, an item type of the one or more items comprising the transaction, a number of available receiving areas within the plurality of receiving areas, or a combination thereof.

10. A check-out apparatus for automated sorting of goods corresponding to a purchase transaction, the apparatus comprising:
a first belt for receiving first goods and having a first barrier for separating the first belt from a merge belt, wherein the first barrier controls the flow of the first goods from the first belt to the merge belt;
a second belt for receiving second goods and having a second barrier for separating the second belt from the merge belt, wherein the second barrier controls the flow of the second goods from the second belt to the merge belt, wherein the merge belt receives the first goods from the first belt when the first barrier is set to an open position, wherein the merge belt receives the second goods from the second belt when the second barrier is set to an open position, and wherein the merge belt transports at least one of the first goods and the second goods to an identification zone;
one or more sensors configured to detect one or more of the first goods received by the first belt and the second goods received by the second belt;
an identification device configured to automatically identify at least one of the first goods and the second goods when said first goods and/or second goods are in the identification zone and for selecting one of a plurality of receiving bays to receive the first goods and/or second goods;
a third belt for receiving the first goods and/or second goods from the merge belt and for diverting the first goods and/or second goods to the selected receiving bay; and
one or more diverter components situated below the third belt,
wherein at least one of the first belt, the second belt, the third belt, and the merge belt is comprised of a plurality of interlocking palettes, each of the plurality of interlocking palettes including a palette belt,
wherein adjacent palettes are detachably meshed via self-aligning peaks and troughs imprinted on facing sides of the adjacent palettes
and wherein the diverter components include a series of rollers that lift to engage one or more of the palette belts and divert at least a portion of the one or more items to the selected receiving area and a controller to trigger one or more rollers in the series of rollers to engage the one or more palette belts.

11. The apparatus of claim 10, wherein the third belt is a cross-belt configured to transport goods in at least three directions.

12. The apparatus of claim 10,
wherein the one or more sensors are configured to measure a speed of the first goods received on the first belt and a speed of the second goods received on the second belt, and to compare the speed of the first goods received on the first belt to the speed of the second goods received on the second belt,
and wherein the apparatus is configured to select the one of the first belt and the second belt having the fastest speed and manipulate the corresponding first or second barrier in order to allow the flow of the first goods or the second goods, whichever corresponds to the selected one of the first belt and the second belt, to the merge belt.

13. The apparatus of claim 10,
wherein the one or more sensors measure the presence and distance of the first goods received on the first belt and the presence and distance of the second goods received on the second belt,
and wherein the apparatus selects to manipulate the one of the first barrier and the second barrier that corresponds to the one of the first belt and the second belt having the shortest distance in order to allow the flow of the first goods or the second goods, whichever corresponds to the one of the first barrier and the second barrier selected for manipulation, to the merge belt.

14. The apparatus of claim 10, wherein when the one or more sensors determines that no goods remain on at least one of the first belt and the second belt, the apparatus selects to manipulate the barrier corresponding to the at least one of the first belt and the second belt in order to stop the flow of at least one of the first goods and the second goods to the merge belt.

15. The apparatus of claim 10, wherein the merge belt alternates between receiving first goods from the first belt and receiving second goods from the second belt for separate transactions.

16. The apparatus of claim 10, further comprising a fourth belt for receiving third goods and having a corresponding third barrier for separating the fourth belt from the merge belt, wherein the corresponding third barrier is configured to control the flow of the received third goods from the fourth belt to the merge belt.

17. A method for diverting items in a transaction to a receiving area, the method comprising:
- transporting one or more items received on a feed belt, the one or more items comprising one purchase transaction;
- identifying the one or more items comprising the purchase transaction during transport;
- processing purchase of each of the one or more items comprising the purchase transaction upon identification;
- determining to dispatch at least a portion of the one or more items comprising the purchase transaction to a selected receiving area; and
- dispatching the at least the portion of the one or more items to the selected receiving area,
- wherein the feed belt is comprised of a plurality of interlocking palettes, each of the plurality of interlocking palettes including a palette belt,
- wherein adjacent palettes are detachably meshed via self-aligning peaks and troughs imprinted on facing sides of the adjacent palettes,
- and wherein dispatching of the at least the portion of the one or more items to the selected receiving area comprises triggering one or more rollers of a series of rollers to lift and engage one or more palette belts such that the items divert to the selected receiving area.

18. The method of claim 17, further comprising determining to dispatch one of the one or more items to an exception area separate from the selected receiving area, the determination based on an inability to automatically identify the one item, detection of damage to the one item, determining the one item has met an expiration date, determining that verification is required for the purchase of the one item, or a combination thereof.

19. The method of claim 17, further comprising:
- receiving a request for a purchase transaction comprising at least one item, and corresponding to a customer shopping list; and
- receiving, for fulfillment of the purchase transaction request, one or more items that are the same or similar to the at least one item of the purchase request.

20. The method of claim 17, further comprising:
- identifying, among the one or more items, an item unfit for purchase,
- dispatching the unfit item for disposal; and
- updating the processed purchase of the unfit item to reflect the disposal of the unfit item.

\* \* \* \* \*